(12) United States Patent
Schneck et al.

(10) Patent No.: US 6,208,986 B1
(45) Date of Patent: *Mar. 27, 2001

(54) WEB INTERFACE AND METHOD FOR ACCESSING AND DISPLAYING DIRECTORY INFORMATION

(75) Inventors: David H. Schneck, Malvern; Steve Cherry, Dresher, both of PA (US); David Goodman, Glasgow (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,992

(22) Filed: Dec. 15, 1997

(51) Int. Cl.[7] .................................................. G06F 17/30

(52) U.S. Cl. .................................. 707/3; 707/1; 707/10; 707/103; 707/104; 707/2; 709/104; 709/225

(58) Field of Search ................................ 707/10, 9, 103, 707/104, 3, 1; 709/104, 225

(56) References Cited

U.S. PATENT DOCUMENTS

| | | |
|---|---|---|
| 5,241,671 | 8/1993 | Reed et al. . |
| 5,297,249 | 3/1994 | Bernstein et al. . |
| 5,355,497 | 10/1994 | Cohen-Levy . |

(List continued on next page.)

OTHER PUBLICATIONS

Cellucci, J. et al., "You Are Here–New Developments In Directory Services Have Managers Wondering Which Way To Take Their Corporate Networks," *Communications Week*, Nov. 11, 1996, Issue 637.

Cole, B., "Vendors Set To Give LDAP Directories A Boost," *Computerworld*, Jan. 6, 1997, pp. 53–54.

Hodges, J., "LDAP & X.500: Road Map & FAQ," *Computing and Communication Services*, Stanford University, Mar.31, 1997.

Levin, C., "Winsock Brings Harmony To New Apps," *PC Magazine*, Jul. 1995.

Moeller, M., "JavaSoft To Unveil New 2–D API," *PC Week*, May 6, 1996.

Schwartz, J., "Is X.500 In Your Future? —The Latest Version Of The OSI Global–Directory Standard Could Help Electronic–Mail Addresses Become As Easy To Access As Telephone Numbers," *Communications Week*, Jun. 17, 1996, Issue 615.

Shuh, B., "Directories And X.500: An Introduction," *Information Technology Services, National Libarary of Canada*, Mar. 14, 1997.

Stanczak, M. "Why LDAP Is Key To Making Directories Go Global," *PC Week*, Jan. 13, 1997.

(List continued on next page.)

Primary Examiner—Hosain T. Alam
Assistant Examiner—Jean M. Corrielus
(74) Attorney, Agent, or Firm—Hunton & Williams

(57) ABSTRACT

A Web interface and method for displaying directory information are disclosed. The Web interface for displaying directory information comprises a server for receiving a directory request, a request processor operatively connected to the server, wherein the request processor links directory data to a template file (214) in response to the directory request, wherein the template file (214) dynamically creates a response to the directory request, and a publisher for publishing the response. A method for displaying directory information in accordance with the invention comprises the following steps: receiving at least one information request; retrieving data from a directory responding to the information request; correlating the data with a template file to create a response, the template file comprising tags for controlling display of the data; and publishing the response.

15 Claims, 24 Drawing Sheets

U.S. PATENT DOCUMENTS

| | | | |
|---|---|---|---|
| 5,388,255 | | 2/1995 | Pytlik et al. ............................ 707/4 |
| 5,412,774 | | 5/1995 | Agrawal et al. . |
| 5,481,666 | | 1/1996 | Nguyen et al. . |
| 5,491,817 | * | 2/1996 | Gopal et al. ........................ 707/200 |
| 5,500,929 | | 3/1996 | Dickinson . |
| 5,530,852 | | 6/1996 | Meske, Jr. et al. . |
| 5,537,546 | | 7/1996 | Sauter . |
| 5,548,723 | * | 8/1996 | Pettus .............................. 709/228 |
| 5,572,643 | | 11/1996 | Judson . |
| 5,572,724 | * | 11/1996 | Watanabe et al. ................. 707/200 |
| 5,600,831 | * | 2/1997 | Levy et al. ............................ 707/2 |
| 5,617,568 | * | 4/1997 | Ault et al. ......................... 707/101 |
| 5,649,186 | * | 7/1997 | Ferguson ............................ 707/10 |
| 5,659,616 | | 8/1997 | Sudia ................................. 380/23 |
| 5,678,045 | | 10/1997 | Bettels ............................... 707/200 |
| 5,708,780 | * | 1/1998 | Levergood et al. ................. 709/229 |
| 5,708,825 | * | 1/1998 | Sotomayor ......................... 707/501 |
| 5,737,533 | * | 4/1998 | Hond .................................. 709/219 |
| 5,742,762 | | 4/1998 | Scholl et al. ....................... 709/200 |
| 5,745,574 | | 4/1998 | Muftic ................................ 380/23 |
| 5,745,683 | | 4/1998 | Lee et al. ............................ 709/250 |
| 5,754,772 | * | 5/1998 | Leaf ............................. 395/200.33 |
| 5,758,343 | * | 5/1998 | Vigil et al. ........................... 707/10 |
| 5,774,552 | | 6/1998 | Grimmer ............................ 380/25 |
| 5,787,450 | | 7/1998 | Diedrich et al. ................... 707/513 |
| 5,812,776 | * | 9/1998 | Gifford .............................. 709/217 |
| 5,822,074 | | 10/1998 | Deason et al. ..................... 356/445 |
| 5,832,225 | * | 11/1998 | Hacherl et al. ..................... 709/223 |
| 5,832,275 | | 11/1998 | Olds ................................. 395/712 |
| 5,835,712 | * | 11/1998 | DuFresne ........................... 709/203 |
| 5,845,067 | | 12/1998 | Porter et al. ....................... 713/200 |
| 5,864,850 | * | 1/1999 | Nordman . |
| 5,872,915 | * | 2/1999 | Dykes et al. ................... 395/188.01 |
| 5,878,219 | * | 3/1999 | Vance Jr. et al. .................. 709/217 |
| 5,878,415 | | 3/1999 | Olds ................................... 707/9 |
| 5,884,035 | * | 3/1999 | Butman et al. ................ 395/200.48 |
| 5,907,846 | | 5/1999 | Berner et al. ...................... 707/103 |
| 5,909,679 | * | 6/1999 | Hall ..................................... 707/4 |
| 5,917,807 | * | 6/1999 | Lee et al. ............................ 370/251 |
| 5,918,010 | | 6/1999 | Appleman et al. ................. 709/203 |
| 5,937,406 | * | 8/1999 | Balabine ............................ 707/100 |
| 5,940,834 | | 8/1999 | Pinard et al. ....................... 707/102 |
| 5,957,695 | | 9/1999 | Redford .......................... 434/307 R |
| 5,987,245 | * | 11/1999 | Gish ................................... 395/680 |
| 5,999,972 | * | 12/1999 | Gish ................................... 709/219 |

OTHER PUBLICATIONS

Wirthman, L., "LDAP Is Key To Unlocking Doors To Global Directories," *PC Week*, Jan. 13, 1997, vol. 14, No. 2, p. 1.

"Web To X.500 Gateway Administrator's Guide," *Soft-Switch Directory Publisher*, Feb. 1997, Version 1.0, p. 1–78.

Christopher "Some conditions for cost effciency in hypermedia", Information processing management, vol. 34, No. 2/3, pp. 309–323, 1998.*

Fargano et al., "first application of the generic network element memory administration interface for digital cross-connect systems", IEEE, vol. 7, pp. 347–352, 1988.*

Buerger "User and administrative interface for a mass storage system" IEEE, pp. 82–84, 1990.*

Kim, Kwang–Soo, "Enabling Customizable World–Wide–Web Access to X.500 Directory", Proceedings of the 1996 Third International Workshop on Services in Distributed and Networked Environments, pp. 162–168.

* cited by examiner

```
<HTML>
<TITLE>%DN%</TITLE>
<BODY>
<PRE>
%TEMPLATE OC="organizationalUnit"%
%ATTR NAME="ou"%: <A HREF="%DN%?">%val name="ou"%</A>
    %ATTR NAME="sa"%: %VAL NAME="sa"%
        %ATTR NAME="1"%: %VAL NAME="1"%
    %ATTR NAME="sopn"%: %VAL NAME="sopn"%
%/TEMPLATE%
</PRE>
%UPLEVEL%UP to XYZCorp%/UPLEVEL%
</BODY>
```

FIG. 9A

```
<HTML>
<TITLE>%DN%</TITLE>
<BODY>   1002
<PRE>    1004
%ATTR NAME="ou"%: %VAL NAME="ou"%<BR>
                                  1006
%TEMPLATE OC="pilotPerson"%
Staff: 1008
                        1018
%LOOP%
%ATTR NAME="cn"%: %LINK%%VAL NAME="cn"% %/LINK%
       1016    %ATTR NAME="t"%: %VAL NAME="t"%
%/LOOP%              1024              1026
%/TEMPLATE%
</PRE> 1010
%UPLEVEL%Up to XYZCorp%/UPLEVEL%  1030
</BODY>  1028
</HTML>
```

Labels: 1002, 1012, 1014, 1020, 1022

FIG. 10A

```
<HTML>

<TITTLE>%DN%</TITLE>

<BODY>         1102

DN : <OL>%DN DELIMIT="<BR>" PRETEXT="<STRONG>"      —1104
1106  POSTTEXT="</STRONG>"%</OL>

%ATTR NAME="ou"% : %VAL NAME="ou" PRETEXT="<STRONG>"  —1108
POSTTEXT="</STRONG>"%<BR><BR>

<PRE>        1110            1112
                                          1116
        %ATTR NAME="sa"%:  %VAL NAME="sa"%
              1114
               %ATTR NAME="l"%:  %VAL NAME="l"%

%ATTR NAME="sopn"%:   %VAL NAME="sopn"%
    </PRE>    1122
                  1118              1120
    %ATTR NAME="d"%:

1124— <UL>  %VAL NAME="d"  POSTTEXT="</LI>"  PRETEXT="<LI>"% </UL>

1126— %TEMPLATE OC="pilotPerson"%

<table align="top" border="1" bgcolor="#00FFFF"
bordercolor="#0000FF">

<td colspan = "3" align="left">

<FONT SIZE="3"><B>The staff : </B></td>

</FONT>

1130— %LOOP%            1134

<tr align="left"><td colspan="1">%LINK%%val NAME="cn"%
%/LINK% </td>
                                            1138
     <td align="right" td colspan="1">%VAL NAME="t"
1136  DELIMIT=","%</td>
                                      1140
```

FIG. 11A-1

```
1132 ——  %LOOP%

</TABLE>

1128 ——  %/TEMPLATE%

<BR>

1142 ——  %TEMPLATE OC="device"%

<table align="top" border="1" bgcolor="#00FFFF"
        bordercolor="#0000FF">

<td colspan = "3" align="left">

<FONT SIZE="3"><B>The products :  </B></td>

</FONT>
                                          1150
1146 ——  %LOOP%
                                         /
1152 ——  <tr align="left"><td colspan="1">%LINK%%val NAME="cn"%
         %/LINK% </td>

<td align="right" colspan="1">%VAL NAME="d"  DELIMIT=",   1154
         "%</td>

1148 ——                                            1156
         %/LOOP%

</TABLE>
                                          1160
1144 ——  %/TEMPLATE%
1158 ——  %UPLEVEL% Go UP  To Previous Level%/UPLEVEL%

</BODY>

</HTML>
```

FIG. 11A-2

```
<HTML>

<TITLE>Organizational Unit Search:   %DN%</TITLE>          1202

%ATTR NAME="ou"%:  %VAL NAME="ou"%<BR>
              1204              1206

%TEMPLATE OC="pilotPerson"%        1208

<BR>

<B>The following people were found:<B><BR>

%LOOP%        1212

%LINK%   %val name="cn"%   %/LINK%<BR>     1218
                              1220
%/LOOP%        1214

%/TEMPLATE%        1210

%TEMPLATE  OC="device"%        1222

<BR>

<B>The following products were found:<B><BR>

%LOOP%

%LINK%   %val name="cn"%   %/LINK%<BR>

%/LOOP%

%/TEMPLATE%        1224

</BODY>

</HTML>
```

FIG. 12A

```
<HTML><TITLE>Sales Staff Search</TITLE>

<BODY>Welcome to the XYZCorp Sales Staff Search.<BR>

Please enter the Common Name to search for.         1302

<FORM METHOD=POST
ACTION="ou%3dSALES%2co%3dXYZCorp%2cc%3dUS?? (cnSF=SN)">

Common Name:<INPUT TYPE=TEXT NAME=param2 SIZE=32
MAXLENGTH=2000><BR>

<INPUT TYPE=CHECKBOX NAME=param1 VALUE="-">Approximate
match.<BR>

<INPUT TYPE=SUBMIT VALUE="Search">

<INPUT TYPE=RESET VALUE="Reset">

</FORM>

</BODY>

</HTML>
```

FIG. 13A

```
<HTML><TITLE>Sales Staff Search</TITLE>

<BODY>Welcome to the XYZCorp Sales Staff Search. <BR>

Please enter the Common Name of the Staff Member you wish to
search for.                                                    1304

<FORM METHOD=POST
ACTION="ou%3dSALES%2co%3dXYZCorp%2cc%3dUS?? (&(cnSF=SN) (objec
tClass=pilotPerson))">

Common Name:<INPUT TYPE=TEXT NAME=param2 SIZE=32
MAXLENGTH=2000><BR>

<INPUT TYPE=CHECKBOX NAME=param1 VALUE="-">Approximate
match.<BR>

<INPUT TYPE=SUBMIT VALUE="Search">

<INPUT TYPE=RESET VALUE="Reset">

</FORM>

</BODY>

</HTML>
```

FIG. 13B

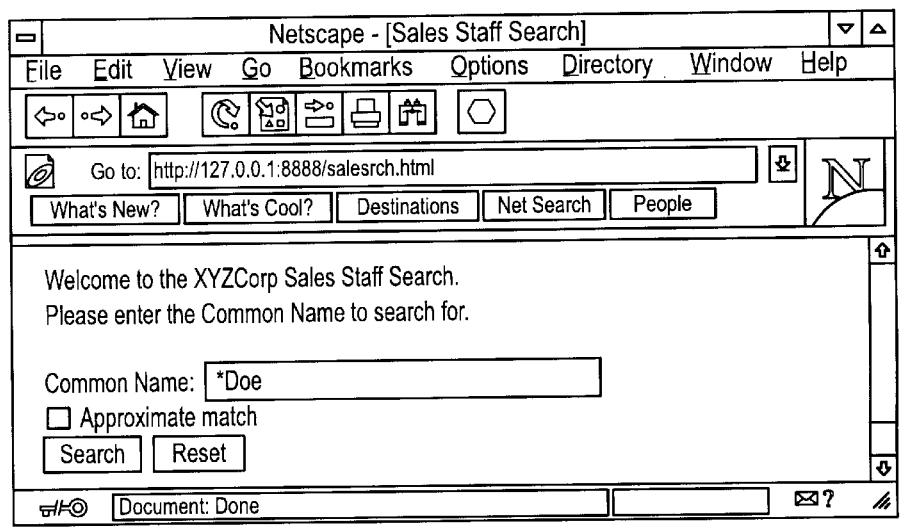

FIG. 13C

```
<HTML><TITLE>Sales Unit Search</TITLE>

<BODY>Welcome to the XYZCorp Sales Unit Search.<BR>

Please enter the Common Name to search for.

<FORM METHOD=POST
ACTION="ou%3dSALES%2co%3dXYZCorp%2cc%3dUS?? (& (cnSF=SN) (ST(ob
jectClass=pilotPerson)))">

Common Name:<INPUT TYPE=TEXT NAME=param2 SIZE=32
MAXLENGTH=2000><BR>

<INPUT TYPE=CHECKBOX NAME=param1 VALUE="-">Aproximate
match.<BR>

<INPUT TYPE=CHECKBOX NAME=param3 VALUE="!">Do not search for
Staff members.<BR>

<INPUT TYPE=SUBMIT VALUE="Search">

<INPUT TYPE=RESET VALUE="Reset">

</FORM>

</BODY>

</HTML>
```

```
<HTML><TITLE>Sales Unit Search</TITLE>

<BODY>Welcome to the XYZCorp Sales Unit Search.<BR>

Please enter the Common Name and Title to search for.

1502

<FORM METHOD=POST
ACTION="ou%3dSALES%2co%3dXYZCorp%2cc%3dUS?? (SC(cnSF=SN) (tSF=
SN))">

You may search on <INPUT TYPE=RADIO CHECKED NAME=param1
VALUE="&">Both or

<INPUT TYPE=RADIO NAME=param1 VALUE="|">Either<BR>

Common Name:<INPUT TYPE=TEXT NAME=param3 SIZE=32
MAXLENGTH=2000><BR>

<INPUT TYPE=CHECKBOX NAME=param2 VALUE="-">Aproximate
match.<BR><BR>

Title:<INPUT TYPE=TEXT NAME=param5 SIZE=32
MAXLENGTH=2000><BR>

<INPUT TYPE=CHECKBOX NAME=param4 VALUE="-">Aproximate
match.<BR><BR>

<INPUT TYPE=SUBMIT VALUE="Search">

<INPUT TYPE=RESET VALUE="Reset">

</FORM>

</BODY>

</HTML>
```

FIG. 15A

WEB INTERFACE AND METHOD FOR ACCESSING AND DISPLAYING DIRECTORY INFORMATION

This application is related to the following: U.S. patent application Ser. No. 08/990,246, entitled "Web Interface and Method for Displaying Directory Information," filed Dec. 15, 1997, U.S. patent application Ser. No. 08/990,765, entitled, "Web Interface and Method for Accessing Directory Information," filed Dec. 15, 1997, and U.S. patent application Ser. No. 08/990,579, entitled "System and Method for Creating a Search Form for Accessing Directory Information," filed Dec. 15, 1997.

BACKGROUND OF THE INVENTION

1. Field of the Invention

The present invention relates generally to an electronic messaging system and more particularly relates to World Wide Web ("Web") interface and method for displaying and accessing directory information.

2. Description of the Background

Electronic directories are evolving into important information tools having a myriad of applications. They operate much like a printed directory; that is, they provide names, locations and other information about people, products, equipment and organizations. First generation network directories were designed for a particular application, such as an employee or e-mail system directory, and thus had limited usefulness outside the scope of the application. However, the growth of local area networks (LANs), heterogeneous e-mail networks, the Internet, and other electronic communications media such as telephone and fax has resulted in enterprises having to manage a hodgepodge of proprietary directory systems. These directory systems rarely interoperate, are costly to maintain, and frequently contain redundant information. Enterprises today are finding a need to unify these disparate directories with a single standards-based directory to reduce maintenance costs and provide universal access through well-defined interfaces. Most directory vendors have chosen X.500 as the technology best suited to meet this need.

Until recently, users could only access information contained in an X.500 directory through specialized applications called directory user agents, or DUAs. DUAs were typically limited in functionality, because (a) they were tailored for particular X.500 implementations, making them unable to interoperate with other X.500 directories, and (b) they typically displayed directory information in a fixed format, with little, if any, ability to customize the presentation of data.

Another shortcoming of existing directory access systems is that they fail to provide users with access to directory information via a World Wide Web ("Web") interface in a configurable manner. Neither the format in which the information is published nor the particular content of the information is customizable. The end result therefore looks the same for any user requesting the information, irrespective of whether the user is linked via an internal network, such as a corporate intranet, or via an external network, such as the Internet. Moreover, the location or identification of the user does not affect the type of information that is provided. This may result in the disclosure of personal or otherwise secure information (such as a home telephone number) to unintended recipients.

SUMMARY OF THE INVENTION

It is therefore an object of the present invention to overcome these and other drawbacks of existing systems.

Another object of the present invention is to provide a messaging directory system that provides access to directory information in homogeneous and heterogeneous messaging environments.

Another object of the invention is to provide a messaging directory system that allows users to publish multiple views of scalable, robust, secure messaging directories.

Another object of the invention is to allow administrators to easily define data mappings and conversions from a wide variety of data sources, thereby integrating multi-sourced content into a directory.

Another object of the invention is to enable users to access information about people, products and resources in an X.500 directory. This information can be on an internal network for enterprise use or on a public network accessible by various individuals, organizations and the like.

Another object of the invention is to combine an X.500 and Lightweight Directory Access Protocol (LDAP) directory server with Web interface technology to provide a user-friendly way to publish enterprise directory information in HyperText Markup Language (HTML) format via the Internet or intranets. Administrators can easily publish directory information that users can access, search and view from Web browsers, LDAP-enabled clients and X.500-based applications.

Another object of the invention is to utilize HTML to allow administrators to define their own LDAP templates, including search criteria, so that users can access this information without having to step through the directory one level at a time or know the structure of the underlying schema.

A technical advantage of the present invention is that it provides an administrator the ability to customize the appearance of the displayed directory information. Another technical advantage is that the invention provides an administrator with improved control over access to the directory information. Another technical advantage is that the invention provides an administrator with the ability to create custom directory information search forms.

According to one embodiment of the present invention, these and other objects and technical advantages of the invention are achieved by providing a Web interface and method for displaying directory information. The Web interface for displaying directory information comprises a server for receiving a directory request, a request processor operatively connected to the server, wherein the request processor links directory data to a template file in response to the directory request, wherein the template file dynamically creates a response to the directory request, and a publisher for publishing the response.

In another embodiment, a method for displaying directory information in accordance with the invention comprises the following steps: (1) receiving at least one information request; (2) retrieving data from a directory responding to the information request; (3) correlating the data with a template file to create a response, the template file comprising tags for controlling display of the data; and (4) publishing the response.

BRIEF DESCRIPTION OF THE DRAWINGS

For a more complete understanding of the present invention, and the objects and advantages thereof, reference is now made to the following descriptions taken in connection with the accompanying drawings in which:

FIGS. 9(a) and 9(b) illustrate a read template file and the corresponding read request output, respectively.

FIGS. 10(a) and 10(b) illustrate a simple list template file and the corresponding simple list request output, respectively.

FIGS. 11(a) and 11(b) illustrate a complex list template file and the corresponding complex list request output, respectively.

FIGS. 12(a) and 12(b) illustrate a search template file and the corresponding search request output, respectively.

FIG. 13(a) illustrates a first example of a search form HTML.

FIG. 13(b) illustrates a second example of a search form HTML.

FIG. 13(c) illustrates a search form output for the examples of FIGS. 13(a) or 13(b).

FIG. 14(a) illustrates a third example of a search form HTML.

FIG. 15(a) illustrates a fourth example of a search form HTML.

DETAILED DESCRIPTION OF THE PREFERRED EMBODIMENTS

The preferred embodiment of the present invention and its advantages are best understood by referring to FIGS. 1 through 15(c) of the drawings, like numerals being used for like and corresponding parts of the various drawings.

Figure 1:
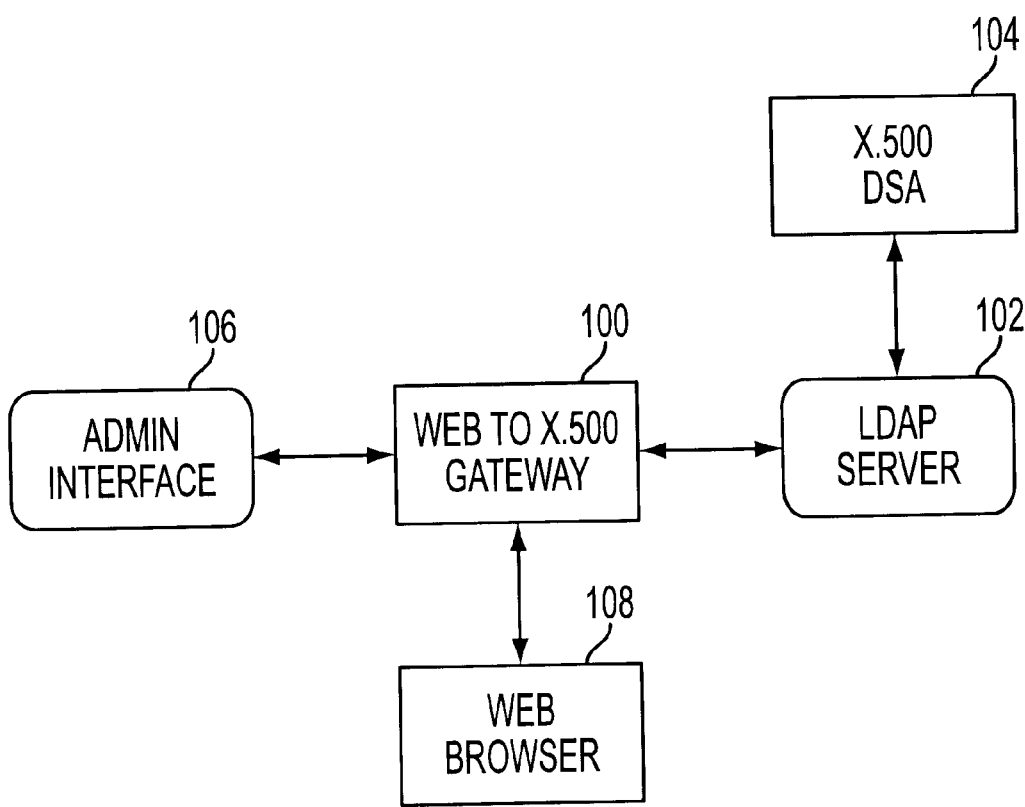
FIG. 1 is a block diagram of a Web interface system.

Referring to FIG. 1, which is a block diagram of a Web interface system, X.500 Distributed System Agent (DSA) 104 is the database in which directory information is stored. Such information may include employees' photographs, phone numbers, product catalogs and the like. DSA 104 communicates with LDAP server 102. In a preferred embodiment, the protocol used in this communication is directory access protocol (DAP). LDAP server 102 is linked to the Web to X.500 gateway 100, which converts an HTTP request into an LDAP request, and vice versa. The Web to X.500 gateway 100 may be further coupled with administrative interface 106, which permits access by an administrator, and Web browser 108, which permits access by a user. Using the Web browser 108, a user can access information about people, products and resources in scalable, robust, secure messaging directories (such as X.500 directories), and can publish multiple views of such information. This information can be on an internal network for enterprise use or on a public network accessible by various individuals, organizations and the like.

The Web to X.500 gateway 100 provides a user-friendly way to publish enterprise directory information. Administrators can easily publish directory information that users can access, search and view from Web browsers, LDAP-enabled clients and X.500-based applications. The Web to X.500 gateway 100 allows administrators to easily define data mappings and conversions from a wide variety of data sources, thereby integrating multi-sourced content into a directory.

Figure 2:
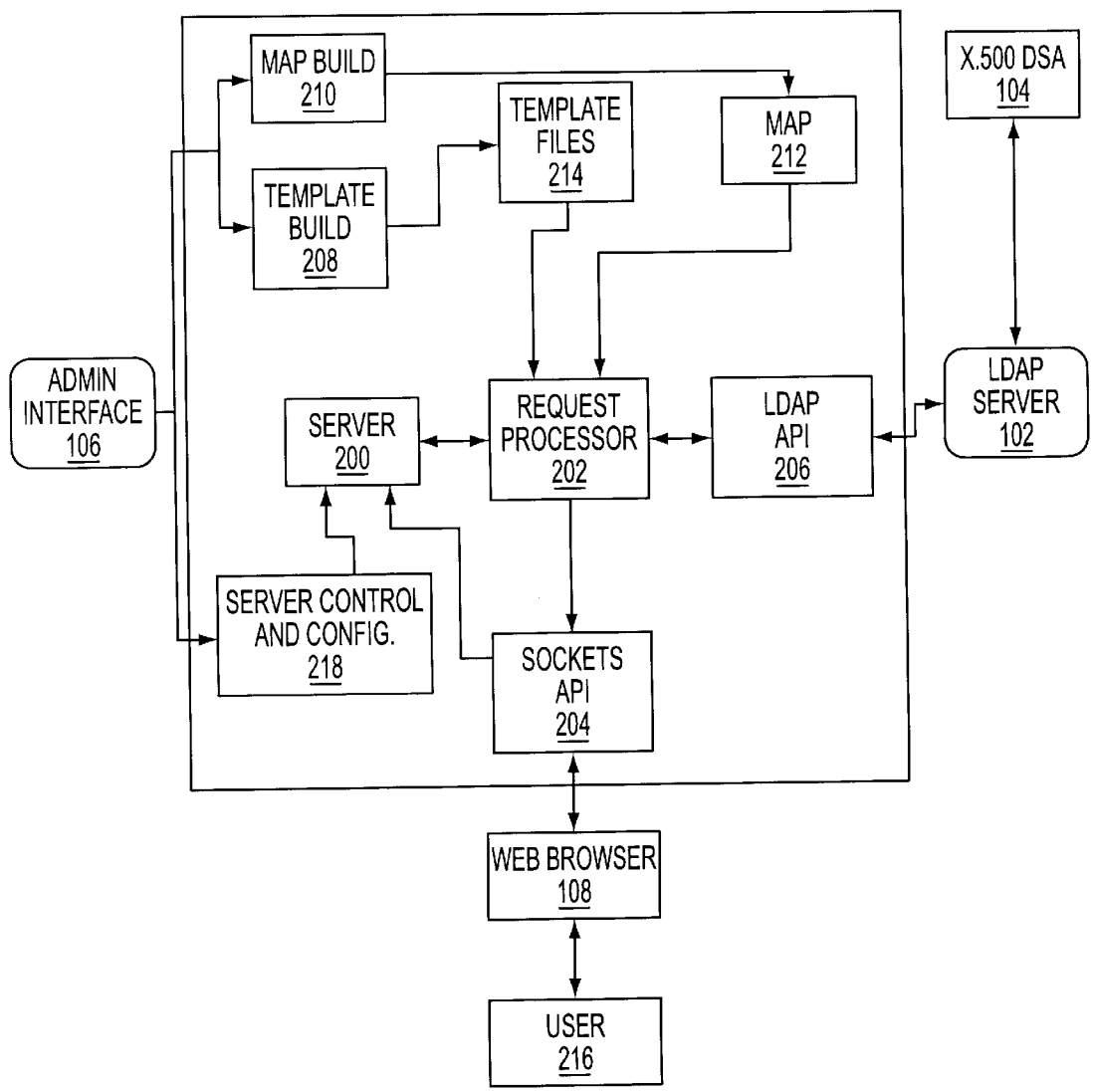
FIG. 2 is a block diagram of a Web interface system including a preferred embodiment of the Web to X.500 gateway.

FIG. 2 illustrates the topology of a preferred embodiment of Web to X.500 gateway 100. The Web to X.500 gateway 100 includes a server (such as a Web server) 200, which accepts requests for directory information; request processor 202, which responds to the requests; map 212, which correlates the requests to template files (i.e., request mapping) and correlates abbreviated names to unabbreviated names (i.e., friendly name mapping); and template files 214, which contain templates that dynamically control the publishing of the requested directory information. A user may access the server 200 liW via Web Browser 108 through Sockets Application Programming Interface (Sockets API) 204. Additionally, an administrator controls and configures the server 200 via Server Control and Configuration system 218.

In order to update and build the map and template files, a map build process 210 and a template build process 208 are used. Map build 210 creates and updates map 212, while template build 208 creates and updates template files 214. The administrator, via Administrator Interface 106, is responsible for the map build process 210 and template build process 208. Map 212 can correlate an abbreviated name to a non-abbreviated name. Map 212 can also correlate a request to a template 214.

The request processor 202 communicates with the LDAP Application Programming Interface (API) 206 in order to access information through the LDAP Server 102 from the X.500 DSA 104.

The server 200 maintains communication with Web clients such as Web browsers 108. The server 200 to Web browser 108 communication is based on the requestresponse model of client/server communication. That is, the client sends a request to the server and the server responds. Generally, the client is requesting a resource that the server will provide. In the case of the Web server/browser communication, the protocol used is HTTP.

Pursuant to the HTTP protocol, the Web browser 108 establishes a connection with the server 200 and sends a request to the server 200. This request contains a request method, a Uniform Resource Locator (URL) and a message containing additional information. The request method can be GET, which retrieves data specified in the URL, or POST, which sends information to the server for further action. The URL specifies a resource accessible by the server. The message contains request modifiers, client information, and possibly a body of data. The body of data contains information that the server will use for further action.

The server 200 responds with a status code and a message containing additional information. The status code may be: OK; a bad request has occurred; an internal server error has occurred; the request method is not implemented by the server; or the server is unavailable. The message contains server information, resource information and possibly a body of data. The body of data contains the resource that was requested or an error message.

The request processor 202 provides the output to the end user. The server 200 starts the request processing and returns to its event-driven loop. A preferred embodiment of the invention handles a plurality of requests, including retrieve resource, Read distinguished name ("DN"), List distinguished name and Search distinguished name.

To process a retrieve resource request, the gateway expects a GET from the client with the URL in the form "path and name of resource." The resource may be an image or static document accessible by the server. The gateway responds with this resource.

To process a read distinguished name (Read) request, the client sends a GET with a URL in the form "Distinguished name." The gateway processes a Read as a single entry read of the DN.

To process the list distinguished name (List) request, the client sends a GET with a URL in the form "Distinguished name?" The gateway processes a List as a single entry read of the DN and a one level list of the DN.

To process the search distinguished name request (Search), the client sends a POST with a URL in the form: "Distinguished name"?"?Search format". The gateway processes a Search as a single entry read of the DN and a full sub-tree search of the DN.

Figure 3:
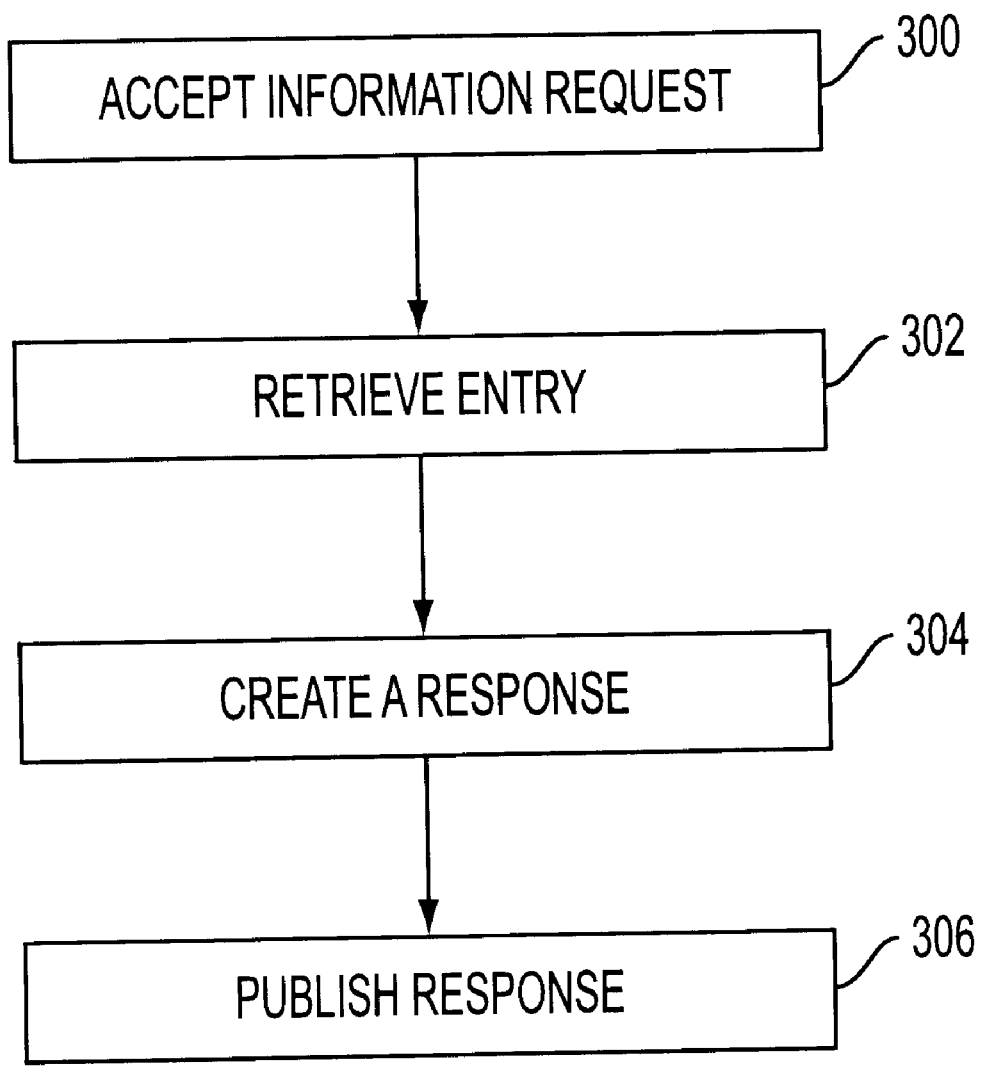
FIG. 3 is a flow chart illustrating the steps for displaying information according to a preferred embodiment of the invention.

FIG. 3 illustrates the steps for displaying directory information, according to a preferred embodiment of the invention. In step 300, the server accepts at least one information request from a Web browser. In step 302, the server retrieves at least one entry from a directory responding to the information request. In step 304, the map correlates the entry with a template file to create a response, the template file including predetermined criteria for controlling the display of the entry. In step 306, the response is published according to predetermined criteria. The response may be published by the request processor 202 to a user via a public network, such as the Internet, or a private network, such as a corporate intranet.

The map 212 is used during request processing to link one object to another. There are two types of mappings used in request processing: request mappings and friendly name mappings. Request mappings are used during request processing to determine which template file should be used. The request mappings link a portion of the X.500 directory to a template file. Request mappings include Read request mappings, List request mappings and Search request mappings.

A specific mapping belonging to the Read, List or Search set may be one or two entity specific types: distinguished name (DN) and/or object class (OC). A distinguished name request mapping correlates a specific DN to a template file. If a request of the specified operation type occurs for this specific DN, then this mapping is used. An object class request mapping correlates all DNs of a specific object class to a template file. If a request of the specified operation type occurs for a DN with this specific OC, then this mapping is used. A distinguished name request mapping preferably always overrides an object class request mapping.

Figure 4:
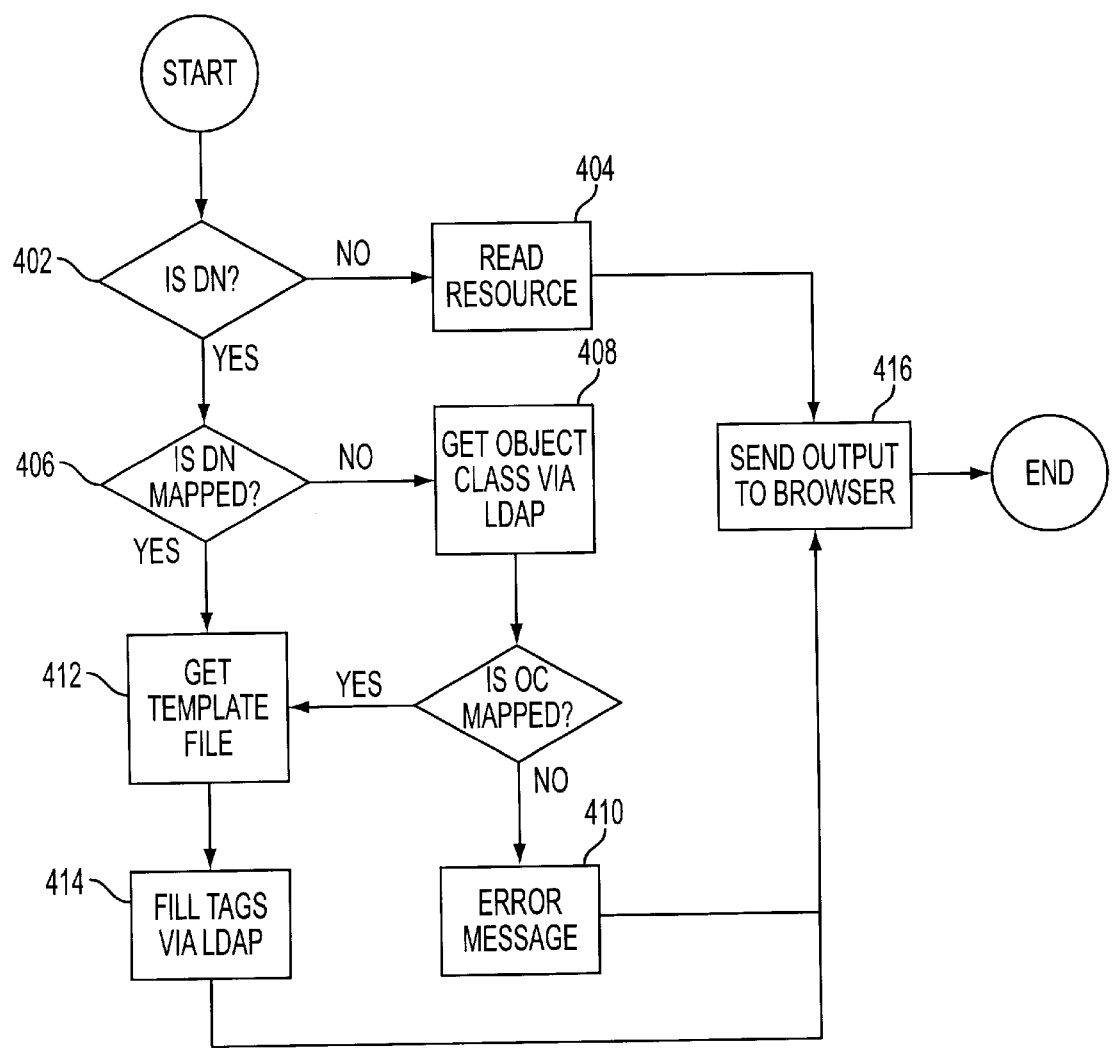
FIG. 4 is a flow chart illustrating the steps for request processing.

FIG. 4 illustrates the steps for request processing in more detail. First, it is determined whether the request is for a DN 402. If the request is not for a DN, the requested resource is read 404. If the request is for a DN, it is determined whether the DN is mapped 406. If the DN is not mapped, the object class of the DN is retrieved from the X.500 directory via LDAP 408 and this OC is used to fin a template, assuming the OC is mapped 412. If the OC is not mapped, an appropriate error message is used 410. If the DN is mapped, the DN is used to find a template 412. If a template is found and the request is a Read or List request, the tags of the template are filled in via LDAP 414. If the template is found and the request is a Search request, a search filter is created from the input data and the search format. The template is then filled in via LDAP 414. If the template is not found, an appropriate error message is used 410. A response is sent to the browser 416.

In the following description, ocfile.html and dnfile.html are used as filename examples. In practice, the filenames would be more descriptive and different for each request mapping type.

Figure 5:
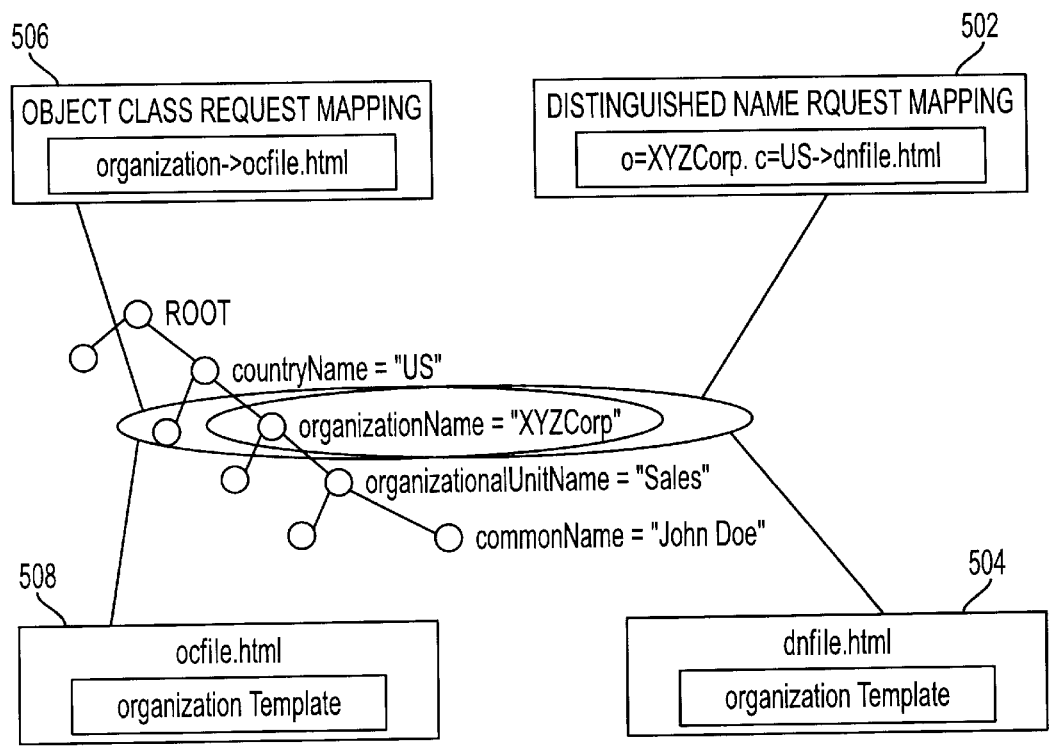
FIG. 5 illustrates an example of Read request mapping.

Read request mapping is used when a Read request is received. A Read request mapping links a portion or multiple portions of the X.500 directory to a specific template file. Referring now to FIG. 5, which illustrates an example of Read request mapping, the relationship between a Read request mapping, the X.500 directory and a template file can be seen. This example shows both DN and OC request mappings.

For the DN request mapping 502, a single portion of the X.500 directory is mapped. The entry o=XYZCorp,c=US is mapped to the template file dnfile.html 504. The file dnfile.html 504 includes a template for the organization object class. A response based on dnfile.htrl is created for a Read request of o=XYZCorp,c=US.

For the OC request mapping 506, multiple portions of the X.500 directory are mapped. For example, the object class organization is mapped to the template file ocfile.html 508. The file ocfile.html 508 includes a template for the organization object class. A response based on ocfile.html is created for a Read request of any organization.

Figure 6:
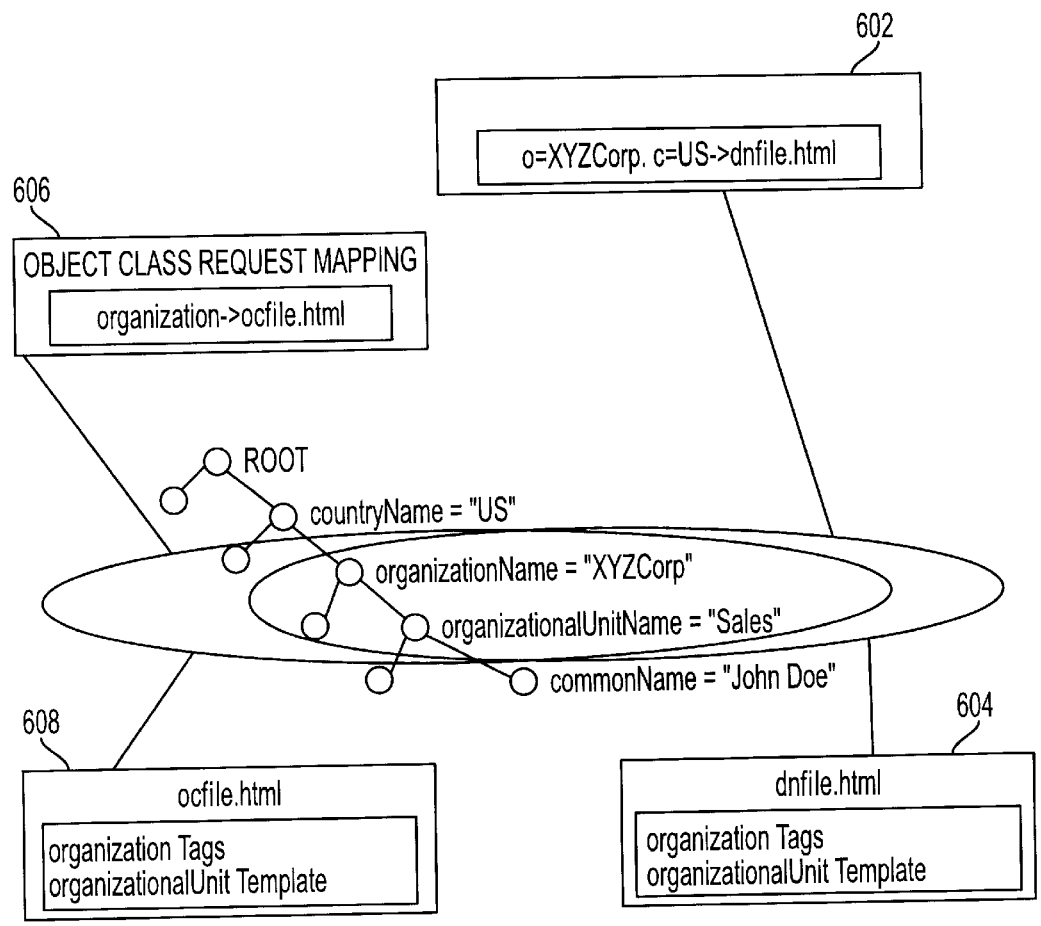
FIG. 6 illustrates an example of List request mapping.

List request mappings are used when a List request is received. A List request mapping links a portion or multiple portions of the directory to a specific template file. Referring now to FIG. 6, which illustrates an example of List request mapping, the relationship between a List request mapping, the X.500 directory and a template file can be seen. This example shows both DN and OC request mappings.

For the DN request mapping 602, a single portion of the X.500 directory is mapped. The entry o=XYZCorp,c=US is mapped to the template file dnfile.html 604. The file dnfile.html 604 includes tags for the organization object class and a template for the organizationalUnit object class and any other immediate subordinate object class. A response based on dnfile.html is created for a List request of o=XYZCorp, c=US.

For the OC request mapping 606, multiple portions of the X.500 directory are mapped. For example, the object class organization is mapped to the template file ocfile.html 608. The file ocfile.html 608 includes tags for the organization object class and a template for the organizationalUnit object class and any other immediate subordinate object class. A response based on ocfile.html is created for a List request of any organization.

Figure 7:
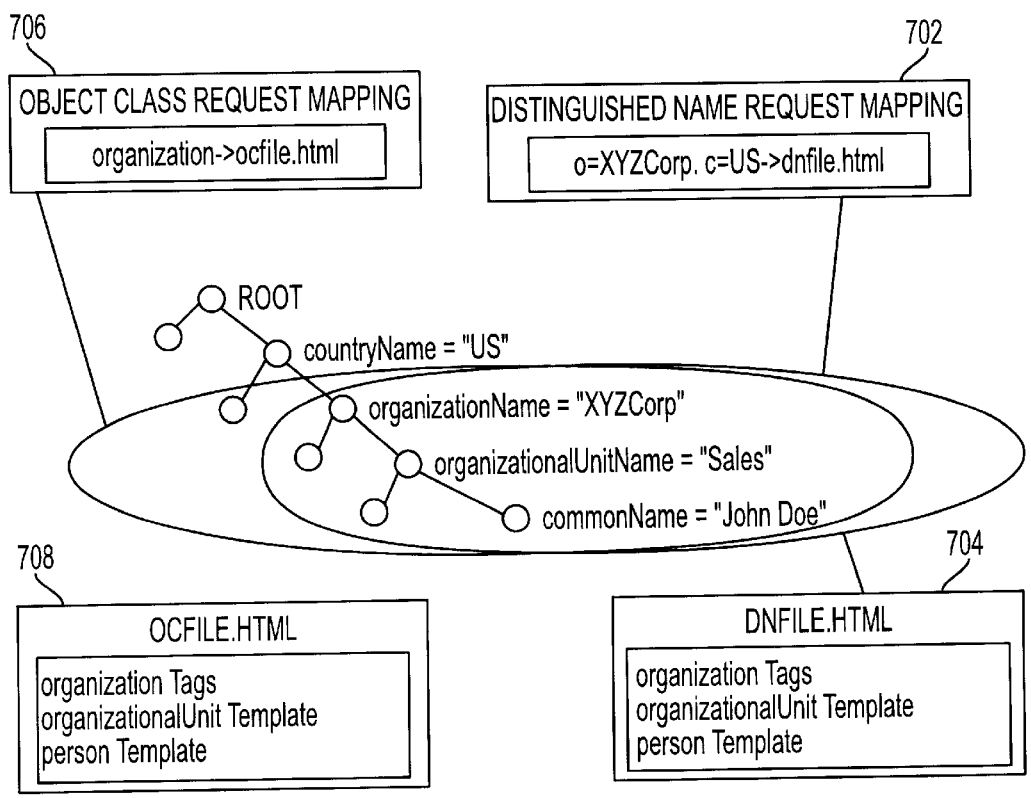
FIG. 7 illustrates an example of Search request mapping.

Search Request mappings are used when a Search request is received. A request mapping that is a member of this set links a portion of the directory (or multiple portions) to a specific template file. Referring now to FIG. 7, which illustrates an example of Search request mapping, the relationship between a search request mapping, the X.500 directory and a template file can be seen. This example shows both DN and OC request mappings.

For the DN request mapping 702, a single portion of the X.500 directory is mapped. The entry o=XYZCorp,c=US is mapped to the template file dnfile.html. The file dnfile.html 704 includes tags for the organization object class, a template for the organizationalUnit object class, a template for the person object class and any other object class in the full sub-tree. A response based on dnfile.html is created for a Search request of o=XYZCorp,c=US.

For the OC request mapping 706, multiple portions of the directory are mapped. The object class organization is mapped to the template file ocfile.html. The file ocfile.html 708 includes tags for the organization object class, a template for the organizationalunit object class, a template for the person object class, and any other object class in the full sub-tree. A response based on ocfile.html is created for a Search request of any organization.

Friendly name mappings are used during request processing to replace abbreviated names with more easily understood names. Two types of friendly name mappings are attribute mappings and country mappings. Attribute mappings are used during request processing to replace (in a response) the X.500 directory attributes with the full name of the attribute. An example of attribute mapping is using "cn" for "Common Name." Country mappings are used during request processing to replace (in a response) returned country names with the full name of the country. Some examples of country mappings are "AR" for "Argentina," "CA" for "Canada," and "US" for "United States."

Any of the mappings, including read request mappings, list request mappings, search request mappings, attribute mappings and country mappings, may be configured by the administrator. Mapping administration preferably is based on schema and directory information. Attribute mappings should be maintained for all attributes within the directory that will be displayed. Country mappings should be maintained for all countries within the directory that will be displayed. Request mappings should be maintained for every object class that a request will be executed. Each of those request mappings requires a template file to fulfill the request. In the event that a response will look different for a specific entry, a distinguished name request mapping must be maintained.

The template files 210 are used in request processing to create a response. Files include non-template files and template files. Non-template files are any files that act as a gateway response to a retrieve resource request. Examples of non-template files are standard HTML files and image files.

Figure 8:
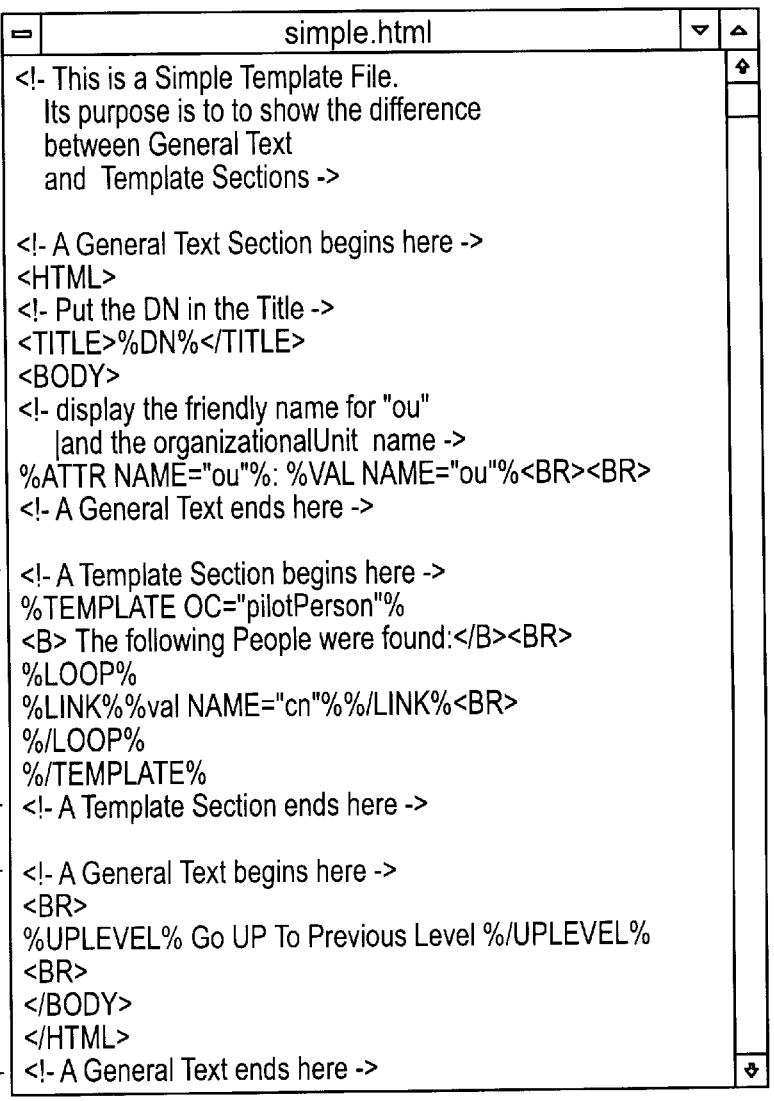
FIG. 8 illustrates the layout of a template file.

Template files are the files that are used to dynamically build responses for Read, List or Search requests. FIG. 8 illustrates a layout of a template file. Template files include general text 802 and templates 804. The general text sections 802 of the template files include HTML codes and special gateway tags, and do not correspond to a specific object class. The general text sections 802 are preferably always displayed and any gateway tags present are filled with data from the DN in the request. The template sections 804 of the template file include HTML codes and special gateway tags. A template 804 defines a section of the template file that is for a specific object class. A template section 804 is preferably only displayed if it corresponds to an object class that is present in the Read, List or Search request.

The gateway tags include TEMPLATE, DN, UPLEVEL, ATTR, VAL, LINK and LOOP. The TEMPLATE tag indicates to the gateway that a template for an object class is being defined. The template may contain any HTML codes in addition to the other gateway tags. A single HTIL file may contain any number of templates. Any templates that are not used will be ignored and discarded in the HTML output. The format of the TEMPLATE tag is: %TEMPLATE OC="objectClass" [options]% %/TEMPLATE%. The string objectclass indicates which object class is to be used for the template. The tag %/TEMPLATE% indicates the end of the template to the gateway. One option is the DISPLAY option, which controls how many values are displayed for a List or Search request. The DISPLAY option may be ONE or ALL. If the DISPLAY option is not present, the template defaults to DISPLAY="ALL". If the ONE option is specified, only the first value found appears in the list.

The DN tag indicates to the gateway that the current distinguished name should be substituted. The format of the DN tag is % DN [options]%. If no options are present, the relative distinguished names (RDNs) are separated by commas. The option PRETEXT="text" places text before each RDN. The option POSTTEXT="text" appends text after each RDN. The option DELIMIT="text" places text between each RDN. In a Read template file, the current DN is defined as the DN in the Read request. In a List or Search template file, the definition depends on the position of the DN tag in the file. If the DN tag is located in the general text section, it is defined as the DN in the List or Search request. If the DN tag is inside a loop, it is defined as the current DN that has been returned by the List or Search request from the X.500 directory.

The UPLEVEL tag generates a hyperlink to a List request on the parent DN of the current DN. The format of the UPLEVEL tag is %/UPLEVEL%[text/tags] %UPLEVEL%. [text/tags] may be any valid HTML and/or the gateway tags ATTR or VAL. The UPLEVEL tag acts like the <A HREF=""></A>HTML control code. Using the enclosed text, it creates a hyperlink to a List request on the parent DN of the current DN.

The ATTR tag replaces in the response the abbreviated X.500 attribute with the friendly name from the attribute mappings. The format of the ATTR tag is %ATTR NAME="name"%. The string name indicates which X.500 attribute mapping to use. If no mapping is found, the abbreviated X.500 attribute is used. This is a text replacement function.

The VAL tag retrieves the values of an X.500 attribute and places them in the HTML document. The format of the VAL tag is %VAL NAME="name"%. The string name indicates which X.500 attribute to retrieve.

The LOOP tag is used to specify that a portion of a template should be repeated for all corresponding DNs. The format of a LOOP tag is: %/LOOP[options]%[loop text]% /LOOP%. The option SPLIT="number" indicates that the returned list should be split into "number" of segments. The option SEGMENT="number" indicates the segment that should be processed in this loop. The text may contain any valid HTML and the gateway tags LINK, ATTR, VAL or DN. LOOP tags may be used in List and Search templates.

The LINK tag acts like the <A HREF=""></A>HTML control code. Using the enclosed text, it creates a hyperlink of a Read request of the current DN. This tag is generally used in a LOOP for a Search or List request, creating links to the DNs listed. The format of a LINK tag is: %LINK% [text/tags] % / LINK%. [text/tags] may be any valid HTML and/or the gateway tags ATTR or VAL.

Template files combine HTML codes with the special gateway tags to allow the display of information from an X.500 directory. A Read template file is used to display data about one specific X.500 directory entry. To process a Read request, the gateway expects a GET from the client with the URL in the form: "Distinguished name". A template should be defined in the template file for the object class of the Read DN. When the template file is processed, any object class that defines the DN will be processed and displayed. A Read template file may include the following tags in its general text or template file: ATTR (X.500 attribute), VAL (X.500 value), DN (current distinguished name), UPLEVEL (hyperlink to List parent DN) and LINK (hyperlink to Read current DN).

Figure 9B:
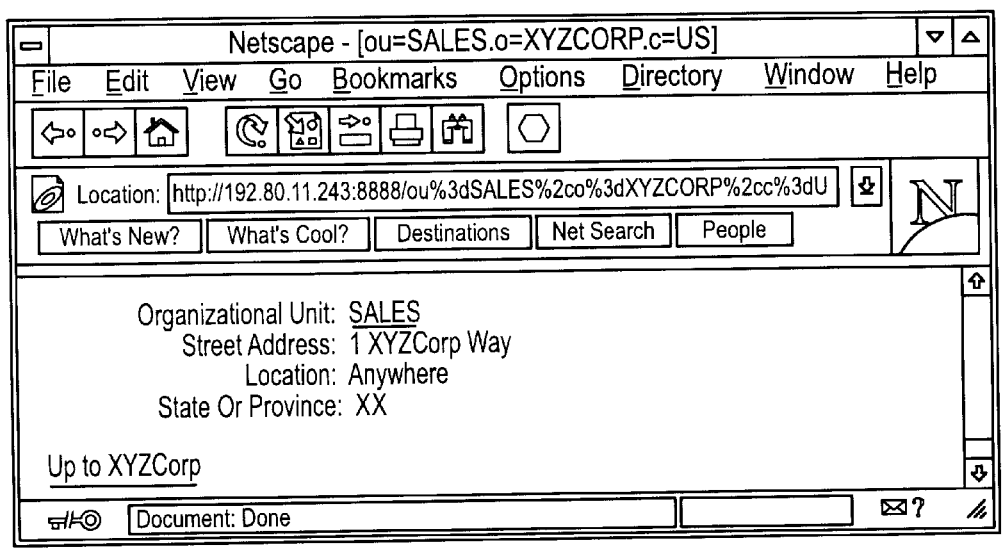

FIGS. 9(a) and 9(b) illustrate a read template file and the corresponding read request output, respectively. The read request output may be in any number of formats, including the one illustrated in FIG. 9(b). Given the template file illustrated in FIG. 9(a), and the Read request of http://127.0.0.1:8888/out%3dSALES%2co%3dXYZCorp%2cc%3dUS, the response would be that illustrated in FIG. 9(b). Based on directory information, the %YDN%o 902 following the <TITLE> 904 is replaced with ou=SALES, o=XYZCORP,c=US. The %TEMPLATE OC="organizationalUnit"% 906 and %/TEMPLATE% 908 define a template section for the organizationalunit object class. Based on attribute mappings, the %ATTR NAME%="ou"% 910 is replaced with Organizational Unit. Based on directory information, the %DN% 912 is replaced with ou=SALES,o=XYZCORP,c=US. Based on directory information, the %val name="ou"% 914 is replaced with SALES. The resulting text (<A HREF="ou=SALES,o=XYZCORP, c=US?">SALES</A>) is displayed by the browser as a hyperlink to list SALES.

Based on attribute mappings, the %ATTR NAME="sa"% 916 is replaced with Street Address. Based on directory information, the %VAL NAME="sa"% 918 is replaced with 1 XYZCorp Way. Based on attribute mappings, the %/ATTR NAME="l"% 920 is replaced with Location. Based on directory information, the %VAL NAME "l"% 922 is replaced with Anywhere. Based on attribute mappings, the %ATTR NAME="sopn"% 924 is replaced with State or Province. Based on directory information, the %VAL NAME="sopn"% 926 is replaced with XX. Finally, the %UPLEVEL% 928 and the %UPLEVEL% 930 define an uplevel section. Based on directory information, the result of the uplevel section (<A HREF="o=XYZCORP,c=US?">Up to XYZCORP</A>) is displayed by the browser as a link to list XYZCorp.

A List template file displays information for an X.500 directory entry and those entries one level below the entry. To process the List request, the gateway expects a GET from the client with the URL in the form: "Distinguished name"?

A template is preferably defined in the template file for each object class that may be used to display directory entries under the distinguished name. Tags are placed in the general text section for the DN to List. The gateway tags that may be used in the general text or template of the List template file include ATTR (X.500 attribute), VAL (X.500 value), DN (current distinguished name), UPLEVEL (hyperlink to List parent DN) and LINK (hyperlink to Read current DN). LOOP, which causes the gateway to loop through all the DNs that correspond to the template, may be used in the template of the List template file.

Figure 10B:
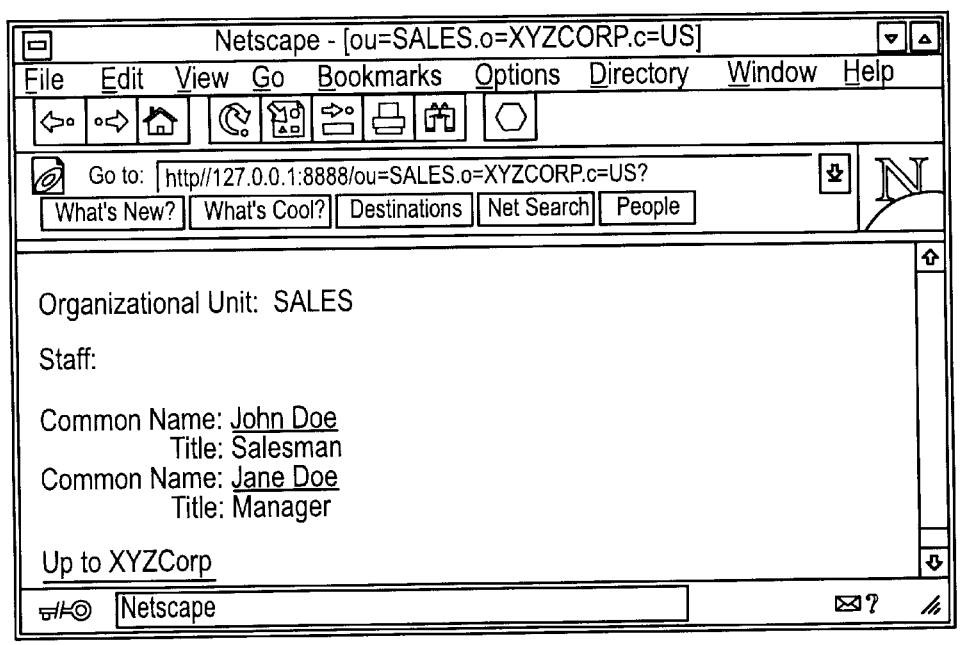

FIGS. 10(a) and 10(b) illustrate a simple list template file and the corresponding simple list request output, respectively. Given the template file illustrated in FIG. 10(a), and the List request http:H/127.0.0.1:8888/ou%3dSALES%2co%3dXYZCorp%2cc%3dUS?, the response would be that illustrated in FIG. 10(b). Based on directory information, the %DN% 1002 is replaced with ou=SALES,o=XYZCORP,c=US. Based on attribute mappings, the %ATTR NAME="ou"% 1004 is replaced with Organizational Unit. Based on directory information, the %VAL NAME="ou"% 1006 is replaced with SALES. The %TEMPLATE OC="pilotPerson"% 1008 and %/TEMPLATE% 1010 define a template section for the pilotperson object class. The %LOOP% 1012 and %LOOP% 1014 define a loop section that will be repeated for every pilotPerson found in the directory.

The following refers to the first pilotPerson found in the directory. Based on attribute mappings, the %ATTR NAME="cn"% 1016 is replaced with Common Name. The %LINK% 1018 and %/LINK% 1020 defines a link section for the current pilotperson. Based on directory information, the %VAL NAME="cn"% 1022 is replaced with John Doe. The result of the link section (<A HREF="cn=JOHN DOE, ou=SALES, o=XYZCORP,c=US">John Doe</A>) is displayed by the browser as a link to read John Doe (see FIG. 10(b)). Based on attribute mappings, the %ATTR NAME="t"% 1024 is replaced with Title. Based on directory information, the %VAL NAME="t"% 1026 is replaced with Salesman. The LOOP is now repeated for the next pilotPerson found in the directory. Based on attribute mappings, the %ATTR NAME="cn"% 1016 is replaced with Common Name. The %LINK% 1018 and %/LINK% 1020 defines a link section for the current pilotperson. Based on directory information, the %VAL NAME="cn"% 1022 is replaced with Jane Doe. The result of the link section (<A HREF="cn=JANE DOE,ou=SALES,o=XYZCORP,c=US">Jane Doe</A>) is displayed by the browser as a link to read Jane Doe (see FIG. 10(b)). Based on attribute mappings, the %ATTR NAME="t"% 1024 is replaced with Title. Based on directory information, the %VAL NAME="t"% 1026 is replaced with Manager. The %UPLEVEL% 1028 and %/UPLEVEL% 1030 define an uplevel section. Based on directory information, the result of the uplevel section (<A HREF="o=XYZCORP, c=US?">Up to XYZCorp</A>) is displayed by the browser as a link to list XYZ Corp (see FIG. 10(b)).

Figure 11B:
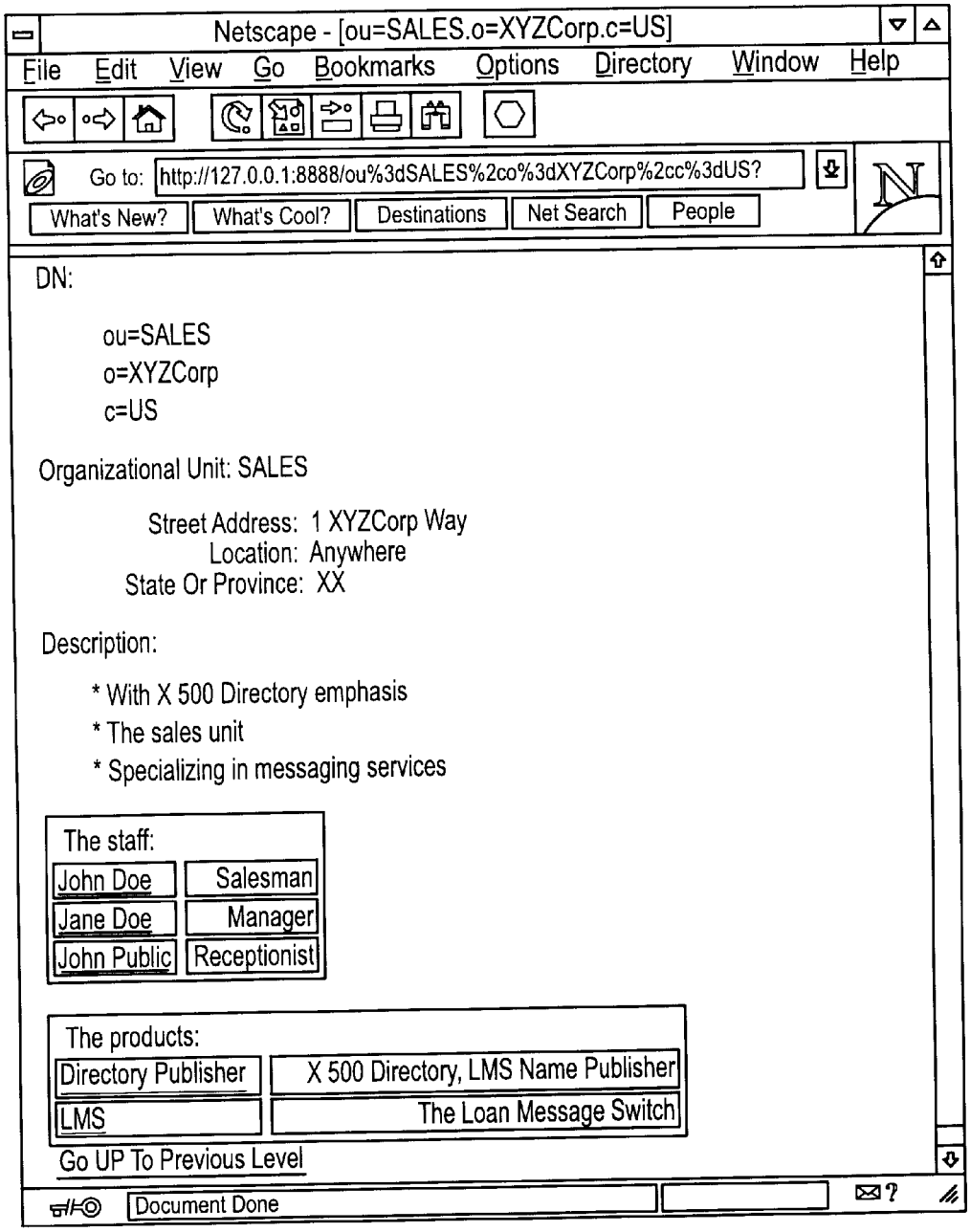

FIGS. 11(a) and 11(b) illustrate a complex list template file and the corresponding list request output, respectively. Given the template file illustrated in FIG. 11(a), and the List request http://127.0.0.1:8888/ou%3dSALESO%2co%3dXYZ Corp%2cc%3dUS?, the response would be that illustrated in FIG. 1 1(b). Based on directory information, the %DN% 1102 is replaced with ou=SALES, o=XYZCORP, c=US. Based on directory information, the %DN DELIMIT="<BR>"PRETEXT= "<STRONG>"POSTTEXT="</STRONG>% 1104 is replaced with <STRONG>ou=SALES</STRONG><BR><STRONG>o =XYZCORP</STRONG><BR><STRONG>c=US </STRONG>. Based on attribute mappings, the %ATTR NAME="ou"% 1106 is replaced with Organizational Unit. Based on directory information, the %VAL NAME="ou "PRETEXT= "<STRONG>"POSTTEXT=</STRONG>"% 1108 is replaced with <STRONG>SALES</STRONG>. Based on attribute mappings, the %ATTR NAME="sa"% 1110 is replaced with Street Address. Based on directory information, the %VAL NAME="sa"% 1112 is replaced with 1 XYZCorp Way. Based on attribute mappings, the %ATTR NAME="l"% 1114 is replaced with Location. Based on directory information, the %VAL NAME="l"% 1116 is replaced with Anywhere. Based on attribute mappings, the %/ATTR NAME="sopn"% 1118 is replaced with State or Province. Based on directory information, the %VAL NAME="sopn"% 1120 is replaced withXy. Based on attribute mappings, the %ATTR NAME="d"% 1122 is replaced with Description. Based on directory information, the %VAL NAME="d"POSTTEXT="</LI>"PRETEXT= "<LI>"% 1124 is replaced with <LI>With X.500 Directory emphasis </LI><LI>The sales unit</LI><LI>Specializing in messaging services</LI>. The %TEMPLATE OC="pilotPerson"% 1126 and %//TEMPLATE% 1128 define a template section for the pilotPerson object class. The %LOOP% 1130 and %/LOOP% 1132 define a loop section to be repeated for every pilotPerson found in the directory.

The following refers to the first pilotPerson found in the directory. The %LINK% 1134 and %/LINK% 1136 defines a link section for the current pilotPerson. Based on directory information, the %VAL NAME="cn"% 1138 is replaced with John Doe. The result of the link section (<A HREF="cn=JOHN DOE, ou=SALES, o=XYZCORP,c=US">John Doe</A>) is displayed by the browser as a link to read John Doe. Based on directory information, the %VAL NAME="t"% 1140 is replaced with Salesman.

The following refers to the second pilotPerson found in the directory. The %LINK% 1134 and %/LINK% 1136 defines a link section for the current pilotPerson. Based on directory information, the %VAL NAME="cn"% 1138 is replaced with Jane Doe. The result of the link section (<A HREF="cn=JANE DOE,ou=SALES,o=XYZCORP, c=US">Jane Doe</A>) is displayed by the browser as a link to read Jane Doe. Based on directory information, the %VAL NAME="t"% 1140 is replaced with Manager.

The following refers to the third pilotperson found in the directory. The %LINK% 1134 and %/LINK% 1136 defines a link section for the current pilotPerson. Based on directory information, the %VAL NAME="cn"% 1138 is replaced with John Public. The result of the link section (<A HREF="cn=JOHN PUBLIC,ou=SALES,o=XYZCORP, c=US">John Public</A>) is displayed by the browser as a link to read John Public. Based on directory information, the %VAL NAME="t"% 1140 is replaced with Receptionist.

The %TEMPLATE OC="device"% 1142 and %/TEMPLATE% 1144 define a template section for the device object class. The %LOOP% 1146 and %/LOOP% 1148 define a loop section to be repeated for every device found in the directory. The following refers to the first device found in the directory. The %LINK% 1150 and %LINK% 1152 defines a link section for the current device. Based on directory information, the %VAL NAME="cn"% 1154 is replaced with Directory Publisher. The result of the link section (<A HREF="cn=DIRECTORY PUBLISHER,ou=SALES, o=XYZCORP,c=US">Directory Publisher</A>) is displayed by the browser as a link to read Directory Publisher. Based on directory information, the %VAL NAME="d" DELIMT=","% 1156 is replaced with X.500 Directory, LMS Names Publisher.

The following refers to the second device found in the directory. The %LINK% 1150 and %/LINK% 1152 defines a link section for the current device. Based on directory information, the %VAL NAME="cn"% 1154 is replaced with LMS. The result of the link section (<A HREF="cn=LMS,ou=SALES,o=XYZCORP,c=US">LMS</A>) is displayed by the browser as a link to read LMS. Based on directory information, the %VAL NAME="d"DELIMIT=", "% 1156 is replaced with The Lotus Message Switch. The %UPLEVEL% 1158 and %/UPLEVEL% 1160 define an uplevel section. Based on directory information, the result of the uplevel section (<A HREF="o=XYZCORP,c=US?">Go UP To Previous Level</A>) is displayed by the browser as a link to list XYZCorp.

To conduct a search, the search template file that is used to create the response and the search form into which the search data is entered are both created. To process the search, the gateway expects a POST from the client with URL to be in the form: "Distinguished name"?"Search format".

A Search template file is used to display information for an X.500 entry and all entries below that DN that meet certain criteria. A Search template file is setup in the same format as a List template file. In the case of a Search template file, a template should be defined for each object class that may exist in the sub-tree of the distinguished name.

The following tags may be used in a Search template file: ATTR (X.500 attribute); VAL (X.500 value); DN (current distinguished name); UPLEVEL (hyperlink to List parent DN); LINK (hyperlink to Read current DN); and LOOP (causes the gateway to loop through all the DNs that correspond to the template). All of these tags may be used in the template, while all but LOOP may be used in general text.

Figure 12B:
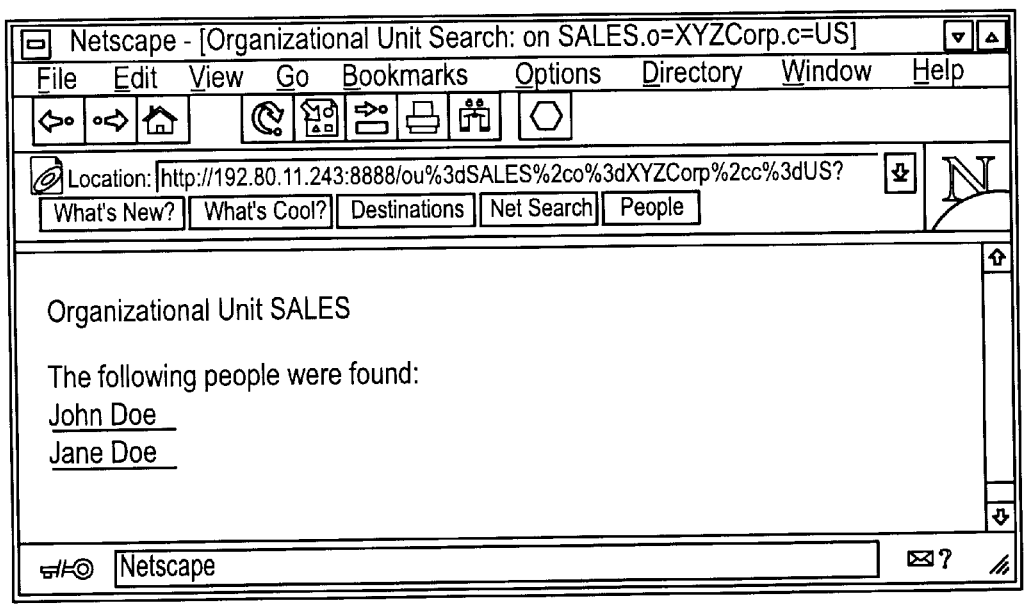

FIGS. 12(*a*) and 12(*b*) illustrate a search template file and the corresponding search request output. Given the Search template file illustrated in FIG. 12(*a*), and the submission of search for commonName ending in Doe and objectClass equal to pilotPerson, the response would be that illustrated in FIG. 12(*b*). Based on directory information, the %DN% 1202 is replaced with ou=SALES,o=XYZCORP,c=US. Based on attribute mappings, the %ATTR NAME="ou"% 1204 is replaced with Organizational Unit. Based on directory information, the %VAL NAME="ou"% 1206 is replaced with SALES. The %TEMPLATE OC="pilotPerson"% 1208 and %/TEMPLATE% 1210 define a template section for the pilotPerson object class. The %LOOP% 1212 and %/LOOP% 1214 define a loop section that will be repeated for every pilotPerson found in the directory.

The following refers to the first pilotperson found in the directory. The %LINK% 1216 and %/LINK% 1218 defines a link section for the current pilotPerson. Based on directory information, the %VAL NAME="cn"% 1220 is replaced with John Doe. The result of the link section (<A HREF="cn=JOHN DOE,ou=SALES,o=XYZCORP, c=US">John Doe</A>) is displayed by the browser as a link to read John Doe.

The following refers to the second pilotPerson found in the directory. The %LINK% 1216 and %/LINK% 1218 defines a link section for the current pilotPerson. Based on directory information, the %VAL NAME="cn"% 1220 is replaced with Jane Doe. The result of the link section (<A HREF="cn=JANE DOE,ou=SALES, o=XYZCORP,c=US">Jane Doe</A>) is displayed by the browser as a link to read Jane Doe.

The %TEMPLATE OC="device"% 1222 and %/TEMPLATE% 1224 define a template section for the device object class. Since the search was for cn ending in Doe and objectClass equal to pilotPerson, this template section is ignored.

To create a search form, an administrator: (1) decides on what attributes to search and what distinguished name to use; (2) creates the search format and numbers the parameters; (3) creates the ACTION string; (4) creates the INPUT sections of the form; and (5) creates a template file with template structures for any object classes that may be returned from the search request. In defining a search format, a plurality of search formats are contemplated. For example, the search format may be an LDAP search filter as defined in RFC 1960, with gateway specific modifications. Instead of the values for the attributes, there are placeholders that are used by the gateway to substitute the input data. The gateway receives the search format and the input data at the time the Search request is made. The gateway then creates an actual LDAP search string from the search format and the input data.

The placeholders include the following: $N, which is the value to search for; $T, which is a NOT character (!); $F, which is a filter type for the equality (~=, >=, <=); and $C, which is a comparison operator (|, &). The filter types are defined as follows: ~= means "approximately equal to"; >= means "greater than or equal to"; and <= means "less than or equal to". The comparison operator | (vertical bar) means "or" and & (ampersand) means "and." The placeholders are used to create the search string format. Each placeholder has an index value associated with it. The index associated with the placeholder is the number associated with the order in which they appear in the string. Indexing the parameters allows the gateway to replace placeholders with actual data.

Once a search format is defined, a form is built. The following HTML tags are used when building a form: (1) METHOD, which is the type of request that is sent when the form is submitted; it preferably is POST; (2) ACTION, which is the URL to be submitted; it preferably is in the form: "Distinguished name"?"?Search format"; and (3) INPUT, which is an input area on the form which follows the form: <INPUT TYPE=type NAME=name VALUE=value>. The TYPE value is preferably one of the following: TEXT, which is an edit box for entering data; RADIO, which is a radio button for selecting one of multiple choices; CHECKBOX, which is a check button for turning an option on or off; SUBMIT, which is a submit button; or RESET, which is a reset button.

In order for the gateway to create the LDAP filter, the form is set up to associate the input areas with the placeholders. This is done by giving the NAME parameter a value containing the index of the placeholder, and having the VALUE value reflect the string that is to be used in the search filter. The NOT operator is a checkbox in the form. Since it is either on or off, only one input line is needed. The VALUE value is an exclamation mark "!". For example, it may look like: <INPUT TYPE=CHECKBOX NAME=param2 VALUE="!"> Not.

The COMPARISON operator is a radio button within the form. The form does not need to display these characters, but it is set up to send them to the gateway for processing. The COMPARISON operator is selected by displaying the two possible values. The NAME value for both selections must be the same in order to have the form send only one of the values. The VALUE value for the And operator must be an ampersand and the VALUE for the Or operator must be a vertical bar. One of the radio buttons is automatically selected by using the CHECKED parameter. For example, it may look like: <INPUT TYPE=RADIO CHECKED NAME=param1 VALUE="&">And. It may also look like: <INPUT TYPE=RADIO NAME=param1 VALUE="|">Or.

The FILTER type operator is a radio button or a checkbox within the form. If more than one choice is given, it preferably is a radio button. If only one choice is given, it preferably is a checkbox. The filter type is used to modify the equality comparison in the filter. It can modify it to be greater than, less than or approximate to.

If more than one choice is given, the NAME value for all selections must be in the same order to have the form send only one of the values, or possibly no value which will leave the equality unaffected. The VALUE value for the greater than operator is the greater than sign (>). The VALUE value for the less than operator is the less than sign (<). The VALUE value for the approximate operator is the tilde (~). It is not necessary to use the CHECKED parameter because the default is no value. One example of a FILTER type operator is: <INPUT TYPE=RADIO NAME=param3 VALUE="<">Less Than.

NAME is a text edit box in the form. If no text is typed into the box, an asterisk (*) is assumed. There are no restrictions on the TEXT input. The user can type wildcards into the text to modify the search criteria. One example is the following: Surname:<INPUT TYPE=TEXT NAME=param4 SIZE=32 MAXLENGTH=2000>.

Preferably all forms have a SUBMIT and RESET button. Selecting the SUBMIT button sends the ACTION value and input data to the gateway. Selecting the RESET button clears all the data entered and sets all buttons to their default values.

FIG. 13(a) illustrates a first example of a search form HTML. This is for a search on the attribute commonName. The LDAP filter may look like: (cn=*Doe), which creates a search on the commonName attribute with a value ending in Doe. The search format is: (cn$F=$N) 1302, where $F stands for the equality filter type and $N stands for the value of commonName.

The above search may be modified to only search entries with an object class of pilotPerson. FIG. 13(b) illustrates a second example of a search form HTML. The LDAP filter might look like: (&(cn=*Doe)(objectClass=pilotPerson)). This is a search on the commonName with a value ending in Doe and an objectClass with a value of pilotPerson. The search format is: (&(cn$F=$N)(objectClass=pilotPerson)) 1304, where $F stands for the equality filter type and $N stands for the value. FIG. 13(c) illustrates a search form output for the examples of FIGS. 13(a) or 13(b).

Figure 14B:
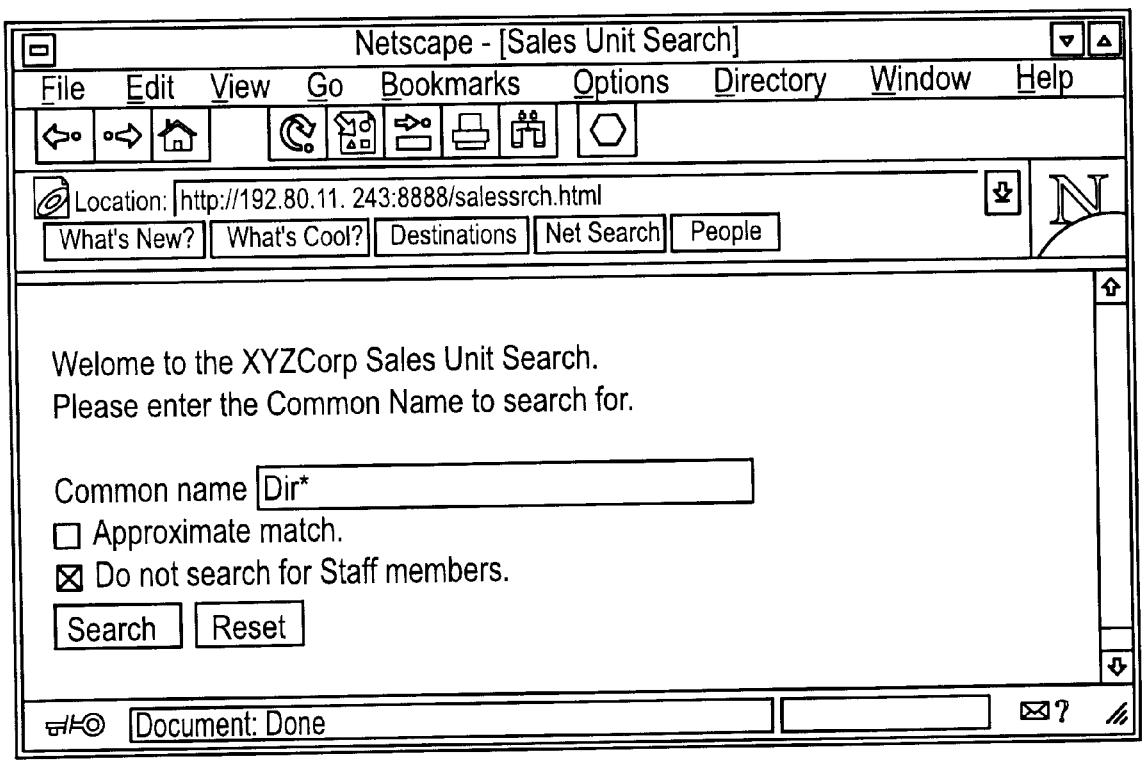
FIG. 14(b) illustrates a search form output corresponding to FIG. 13(a).
Figure 14C:
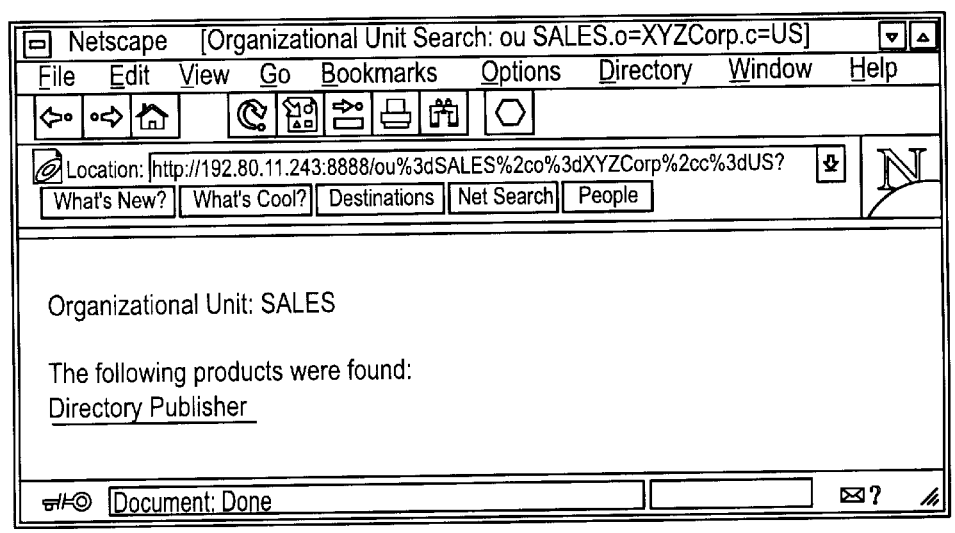
FIG. 14(c) illustrates a search request output corresponding to FIGS. 14(a) and 14(b).

The above example may be modified to allow the user to look for entries other than pilotPerson, as illustrated by the search form HTML of FIG. 14(a). The search format would be: (&(cn$F=$N)($T(objectClass=pilotPerson))) 1402, where $F stands for the equality filter type and $N stands for the value of commonName. FIG. 14(b) illustrates a search form output corresponding to FIG. 14(a), and FIG. 14(c) illustrates the corresponding search request output.

Figure 15B:
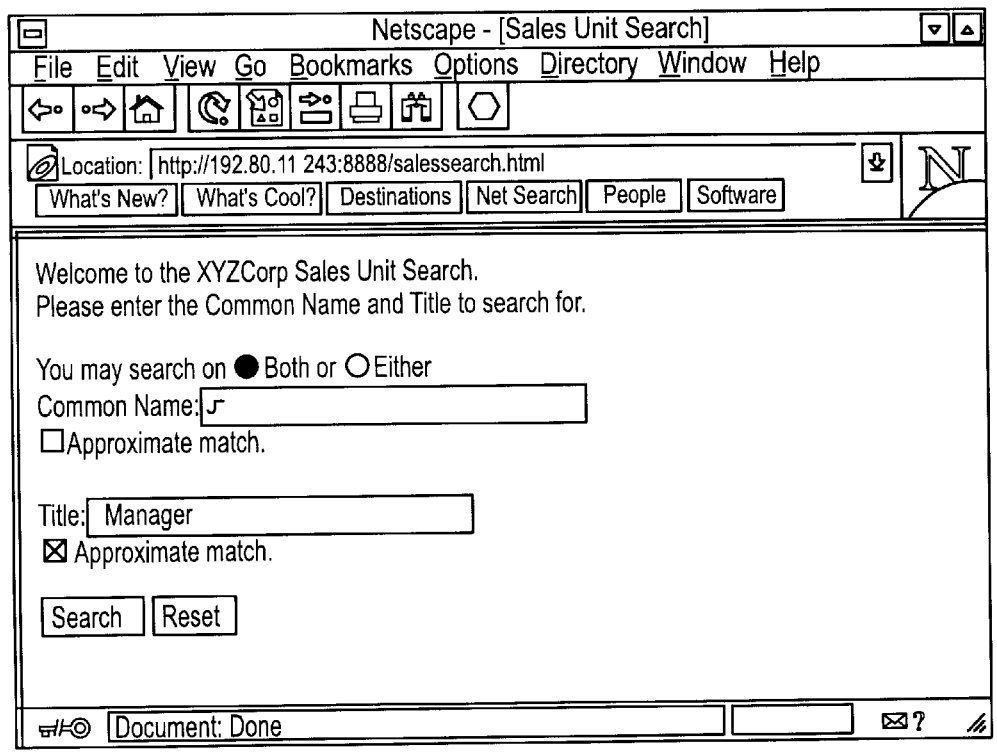
FIG. 15(b) illustrates a search form output corresponding to FIG. 15(a).
Figure 15C:
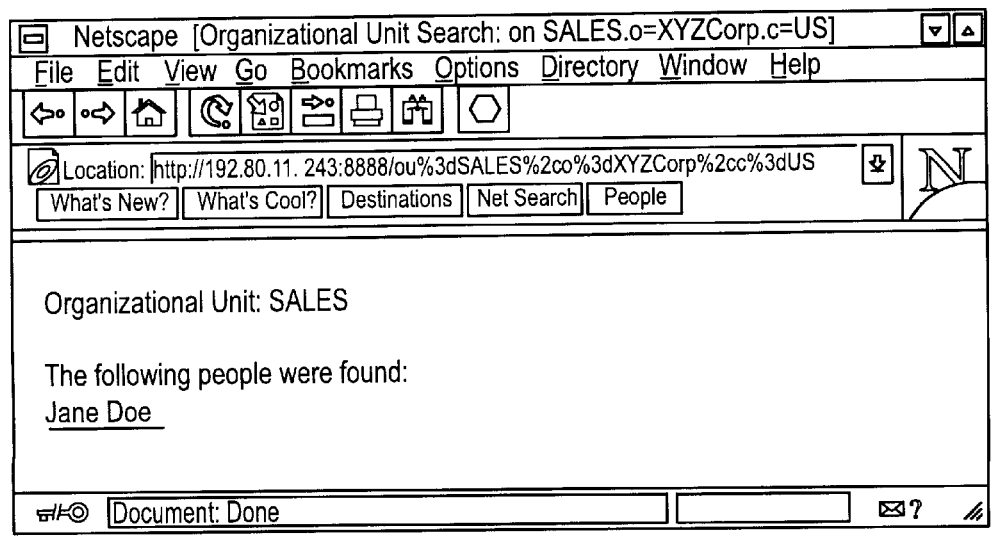
FIG. 15(c) illustrates a search request output corresponding to FIGS. 15(a) and 15(b).

A search may also be conducted on the attribute commonName and/or the attribute title, as illustrated by the search form HTML. The LDAP filter may look like: (&(cn=J*)(t~=Manager)). This is a search on the commonName attribute with a value beginning with J and a title approximately equal to Manager. The search format is: ($C(cn$F=$N)(t$F=$N)) 1502, where $F stands for the equality filter type, $N stands for the value and $C stands for a compare. FIG. 15(b) illustrates a search form output corresponding to FIG. 15(a), and FIG. 15(c) illustrates the corresponding search request output.

Another embodiment of the invention automatically formats search results into clickable lists, tables, frames and other constructs represented in HTML. For example, once a person is selected from an employee locator, his Internet e-mail address may be selected and automatically placed in the "TO" field of the user's Internet mail client.

In another embodiment of the invention, an administrator can configure various system parameters, including server parameters, LDAP parameters, logging parameters and administrator parameters.

A Server page allows configuration of parameters relevant to the server. These parameters include connection and HTML information. The connection parameters includes Port, Maximum Number of Connections, Maximum Number of Backlog Connections, Idle Disconnect Time-out and Watchdog Timer. Port is the port on which the gateway listens for requests. Maximum connections is the maximum number of requests the gateway processes at one time. This allows the gateway to refuse connections after this maximum has been reached. Maximum backlog connections is the maximum number of requests the gateway will allow pending. Idle disconnect time-out is the number of seconds the gateway allows a request to process before attempting to close the connection. This allows the gateway to limit the amount of time a connection is alive; when this limit is reached, the gateway attempts to close the connection. Watchdog timer is the number of seconds between gateway checks for idle disconnects. This allows the gateway to check all open connections to see if they should be closed. Base path is the path for all requests; all relative URLs are preferably relative to this directory. Default file is the default HTML file. When a request is made, this file is sent.

An LDAP page allows configuration of the LDAP connection parameters. LDAP parameters include host parameters, bind parameters and search time-out parameters. Host parameters include Address and Port. The Address parameter is the IP address of the LDAP server, which allows the gateway to execute LDAP searches on the X.500 directory through the LDAP server. Port is the port of the LDAP server. Bind parameters include User Name and Password. User name is the user (Distinguished Name) the gateway should bind as. Password is the password the gateway should use when binding. Search time-out parameters include Infinite LDAP Time-out and LDAP Search Time-out. The former asks whether it is desired for the LDAP searches to have no time-out. An LDAP search can be configured to have no time-out value. This means that an LDAP search will wait infinitely for results. The latter asks what the LDAP searches time-out value is. An LDAP search can be configured to have a specific time-out value. This means that an LDAP search will wait only this amount of time for results. If this wait time is reached, an error will occur. This parameter is only available if the Infinite LDAP Time-out parameter is not chosen.

A Log page allows configuration of the logging capabilities of the gateway. Logging parameters include Number of Files, Records per File and Log Level. With respect to the number of files, the administrator is asked how many log files should be maintained. Once the maximum number of log records is reached in a log file, the gateway creates a new log file, up to the number of files specified here. Once that number is reached, the oldest log file is overwritten. With respect to Records per File, the administrator is asked what is the maximum number of records per log file. The gateway writes a specified number of log records to a log file before closing that log file and creating a new one. With respect to Log Level, all log messages defined by the gateway are assigned a log level. Only log messages associated with the specified logging level are output to the log. Logging levels include MINIMAL, NORMAL, INTENSIVE and DEBUG. These levels indicate the quality of information the gateway writes to the log files, with MINIMAL being the minimum level and DEBUG being the maximum level.

An Administrator page allows configuration of the Administrator application. The parameter countries is the list of countries that are available for the administrator application. The schema file parameter is the schema file used by the administrator application. This asks the administrator to identify the name and path of the schema file used by the DSA. The schema file is used to obtain object classes and attribute lists.

The administrator also has the ability to customize the appearance of the display of directory information. The administrator may set, inter alia, the background color, the font, the font color, the font size, and the page layout. Further, the administrator may use graphics, such as the organizational logo, on the page. Since directory information is placed into dynamically created HTML documents and displayed in a Web Browser, the administrator may control the page layout. All standard HTML tags may be used in these documents. By writing HTML, the administrator may control the presentation and flow of the document and accordingly the directory information.

Access to the directory information may also be controlled by the administrator. For example, an administrator may desire to allow Web browsers to access employee names, but may not wish for these Web browsers to have access to employee home telephone numbers or addresses. The administrator may choose what information from the directory that is displayed in the Web Browser. The administrator does this by including or excluding the appropriate VAL tags in the document.

In another embodiment, this access list may be based on an organization's hierarchy, providing full directory information access to senior members, and lesser directory information access to lower-ranking members.

Other embodiments and uses of the invention will be apparent to those skilled in the art from consideration of the specification and practice of the invention disclosed herein. The specification should be considered exemplary only, with the true scope and spirit of the invention indicated by the following claims.

We claim:

1. A Web interface for accessing and displaying directory information comprising:
   a server, said server receiving a directory request in a first protocol;
   a request processor operatively connected to said server;
   an application program interface in communication with said request processor;
      wherein said request processor communicates said directory request to said application program interface in order to access directory data in a second protocol;
      wherein said request processor links said directory data to a template file in response to said directory request; and
      wherein said template file dynamically creates a response to said directory request;
   an administrative interface, wherein said administrative interface comprises:
      a directory information display customizer that enables the customization of, at least, the appearance of displayed directory information; and
      a directory information access controller that enables control over the level of access to said directory information; and
   a publisher for publishing said response.

2. The Web interface according to claim 1, wherein said directory data is data from an X.500 directory.

3. The Web interface according to claim 1, further comprising a user interface operatively associated with said server, wherein said user interface allows a user to enter said directory request.

4. The Web interface according to claim 3, wherein said user interface is a World Wide Web interface.

5. A Web interface for accessing and displaying directory information comprising:
   a distributed system agent, wherein said distributed system agent stores directory information, wherein said directory information comprises directory data and wherein said directory data is in a X-500 protocol;

a first server for receiving a request, in a HTTP protocol, to retrieve said directory data;

a request processor operatively connected to said first server, wherein said request processor links said directory data to a template file, wherein said template file dynamically builds a response to said request;

an administrative interface, wherein said administrative interface comprises:

a directory information display customizer that enables the customization of, at least, the appearance of displayed directory information; and a directory information access controller that enables control over the level of access to said directory information; and a second server operatively connected to said distributed system agent and said request processor via an application programming interface, wherein said second server retrieves said directory data.

6. The Web interface of claim 5, further comprising means for publishing said response.

7. The Web interface of claim 5, wherein said first server is operatively associated with a Web browser.

8. The Web interface of claim 5, wherein said distributed storage agent comprises X.500 directory information.

9. A method for accessing and displaying directory information comprising:

receiving at least one information request in a first protocol;

retrieving data from a directory responding to said information request, wherein said directory communicates using a second protocol; correlating said data with a template file to create a response, said template file comprising a tag for controlling display of said data and predetermined criteria for controlling display of said response;

defining said predetermined criteria, wherein said step of defining comprises implementing an administrative interface that enables the customization of, at least, the appearance of displayed directory information and the level of access to said directory information; and publishing said response.

10. The method of claim 9, further comprising the step of configuring said template file.

11. A Web interface for accessing and displaying directory information comprising:

server means receiving a directory request in a first protocol;

request processor means operatively connected to said server means;

application program interface means in communication with said request processor means;

wherein said request processor means communicates said directory request to said application program interface means in order to access directory data in a second protocol;

wherein said request processor means links said directory data to a template file in response to said directory request; and wherein said template file dynamically creates a response to said directory request;

administrative interface means, wherein said administrative interface means comprise:

directory information display customizer means that enable the customization of, at least, the appearance of displayed directory information; and directory information access controller means that enable control over the level of access to said directory information; and publisher means for publishing said response.

12. The Web interface according to claim 11, wherein said directory data is data from an X.500 directory.

13. The Web interface according to claim 11, further comprising user interface means operatively associated with said server means, wherein said user interface means allows a user to enter said directory request.

14. The Web interface according to claim 13, wherein said user interface means is a World Wide Web interface.

15. A processor usable medium having processor readable code embodied therein for enabling a system for accessing and displaying directory information comprising:

request receiving processor readable code for receiving a directory request in a first protocol;

request processing processor readable code;

application program interface processor readable code that enables communication with a request processor;

wherein said request processing processor readable code enables communication of said directory request to an application program interface in order to access directory information in a second protocol;

wherein said request processing processor code enables linking said directory data to a template file in response to said directory request; and wherein said template file comprises response generating processor readable code that enables said template file to dynamically create a response to said directory request;

predetermined criteria defining code that enables an administrative interface to customize, at least, the appearance of displayed directory information and the level of access to said directory information; and publishing processor readable code for publishing said response to said directory request.

* * * * *